US010151423B2

(12) United States Patent
Shelef et al.

(10) Patent No.: US 10,151,423 B2
(45) Date of Patent: Dec. 11, 2018

(54) KINEMATIC MOUNT

(71) Applicants: Ben Shelef, Saratoga, CA (US);
Shmuel Erez, San Jose, CA (US)

(72) Inventors: Ben Shelef, Saratoga, CA (US);
Shmuel Erez, San Jose, CA (US)

( * ) Notice: Subject to any disclaimer, the term of this patent is extended or adjusted under 35 U.S.C. 154(b) by 395 days.

(21) Appl. No.: 14/782,589

(22) PCT Filed: Apr. 4, 2014

(86) PCT No.: PCT/US2014/033090
§ 371 (c)(1),
(2) Date: Oct. 5, 2015

(87) PCT Pub. No.: WO2014/165828
PCT Pub. Date: Oct. 9, 2014

(65) Prior Publication Data
US 2016/0069506 A1 Mar. 10, 2016

Related U.S. Application Data

(60) Provisional application No. 61/928,993, filed on Jan. 17, 2014, provisional application No. 61/808,428, (Continued)

(51) Int. Cl.
F16C 11/10 (2006.01)
F16M 11/12 (2006.01)
F16M 11/10 (2006.01)
F16M 11/14 (2006.01)
G02B 7/00 (2006.01)
F16M 11/04 (2006.01)
F16M 11/22 (2006.01)

(52) U.S. Cl.
CPC .......... *F16M 11/14* (2013.01); *F16C 11/106* (2013.01); *F16M 11/041* (2013.01);
(Continued)

(58) Field of Classification Search
CPC ..... B25J 17/0216; F16C 11/06; F16C 11/106; F16M 7/00; F16M 11/04; F16M 11/041;
(Continued)

(56) References Cited

U.S. PATENT DOCUMENTS 5,568,993 A * 10/1996 Potzick ................ F16C 11/06
403/169
5,681,981 A * 10/1997 McMurtry ........... B23Q 1/5462
33/502

(Continued)

*Primary Examiner* — Josh Skroupa
(74) *Attorney, Agent, or Firm* — Womble Bond Dickinson (US) LLP; Joseph Bach, Esq.

(57) ABSTRACT

A kinematic mount with more than three mating elements. To function properly, the sum total of DOFs constrained by the mating elements is six. Mounts that have four mating elements—for example a Pivot and three Spacers, or two Sliders and two Spacers, are beneficial. Conditions are shown under which the four-legged mounts are kinematic, stable and can be assembled from one direction, kinematic mount connecting two subassemblies along a mating direction, comprised of four mating elements, each mating element having two components, each attached to a different subassembly, two of said mating elements being Slider mating elements each having a Slide Axis and constraining two degrees of motion, and the other two of said mating elements each being a Spacer mating element each having a Spacer Axis and constraining a single degree of motion, said mating elements configured to jointly constrain six independent degrees of motion.

19 Claims, 23 Drawing Sheets

Related U.S. Application Data filed on Apr. 4, 2013, provisional application No. 61/808,416, filed on Apr. 4, 2013.

(52) U.S. Cl.
CPC ........... *F16M 11/121* (2013.01); *F16M 11/22* (2013.01); *G02B 7/003* (2013.01); *Y10T 403/32311* (2015.01)

(58) Field of Classification Search
CPC .. F16M 11/121; F16M 11/14; F16M 11/2042; F16M 11/2078; F16M 11/22; G02B 7/003; Y10T 403/32032; Y10T 403/32041; Y10T 403/32311; Y10T 403/32631; Y10T 403/34; Y10T 403/347
USPC ...................... 403/57, 90, 122, 169, 176, 56
See application file for complete search history.

(56) References Cited

U.S. PATENT DOCUMENTS

| | | | | |
|---|---|---|---|---|
| 5,901,936 A * | 5/1999 | Bieg | .................... | B23Q 1/5462 248/163.2 |
| 6,641,323 B2 * | 11/2003 | Ronsheim | ............. | F16C 11/106 403/122 |
| 6,681,495 B2 * | 1/2004 | Masayuki | .............. | B25J 9/1692 33/501 |
| 6,902,345 B2 * | 6/2005 | Kur | ..................... | F16C 11/0623 403/135 |
| 7,040,033 B2 * | 5/2006 | Zhu | ...................... | G01B 21/042 33/502 |
| 7,281,693 B2 * | 10/2007 | Chou | ..................... | F16M 11/14 403/90 |
| 7,810,248 B2 * | 10/2010 | McMurtry | ........... | B25J 17/0266 33/503 |
| 8,505,392 B2 * | 8/2013 | Zhang | .................... | F16M 11/14 33/503 |
| 8,578,811 B2 * | 11/2013 | Alet | ....................... | B25J 9/0042 74/490.09 |
| 8,900,009 B2 * | 12/2014 | Hornick | ............... | F16M 11/041 248/288.51 |
| 8,956,068 B2 * | 2/2015 | Mekid | .................... | F16M 11/14 403/122 |
| 2009/0297257 A1 * | 12/2009 | McMurtry | .............. | F16C 11/06 403/122 |
| 2013/0118287 A1 * | 5/2013 | Holgate | .................. | B25J 17/00 74/490.01 |

\* cited by examiner

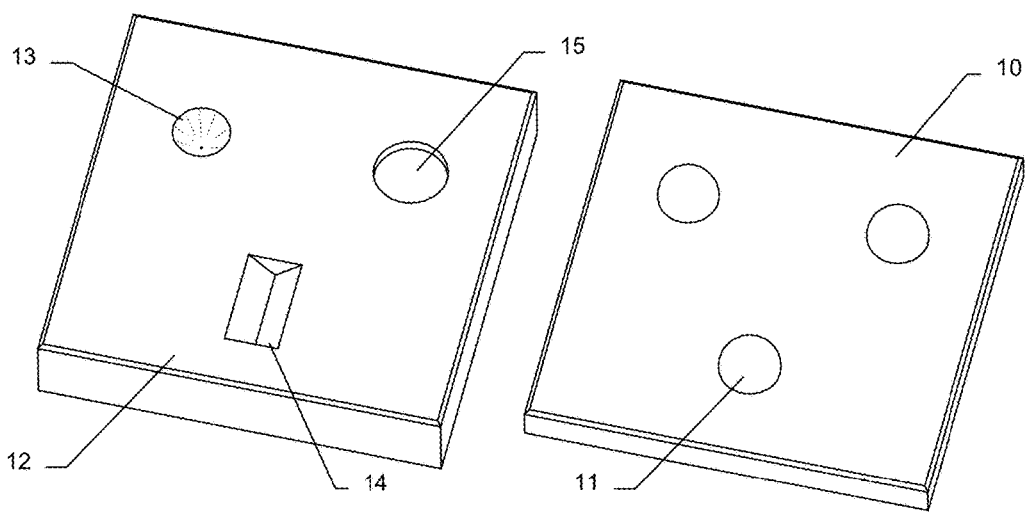
Figure 1A – Prior Art        Figure 1B – Prior Art
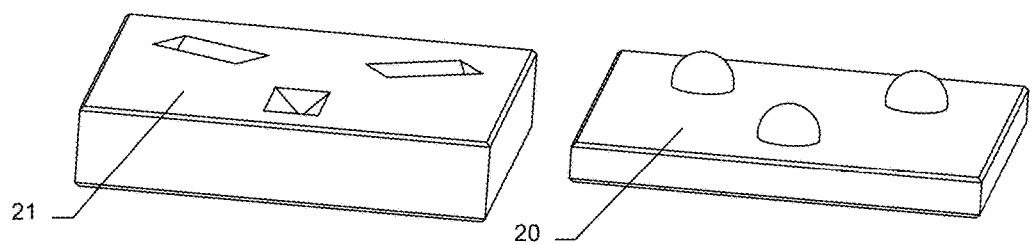
Figure 2A – Prior Art        Figure 2B – Prior Art

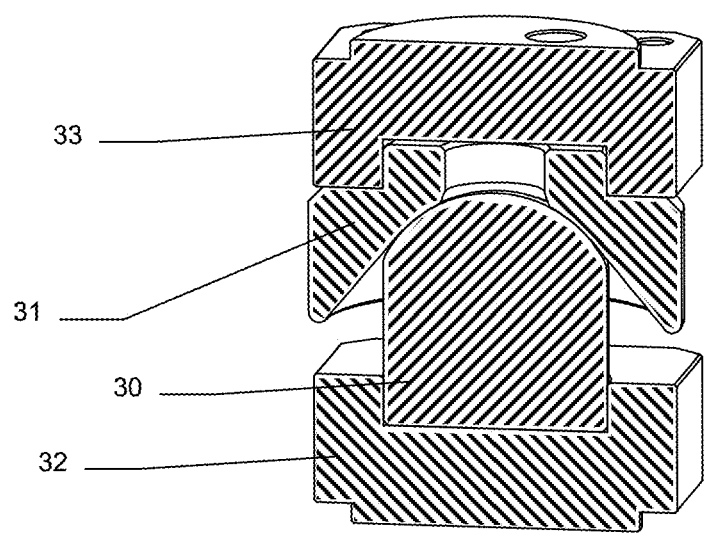
Figure 3 – Prior Art

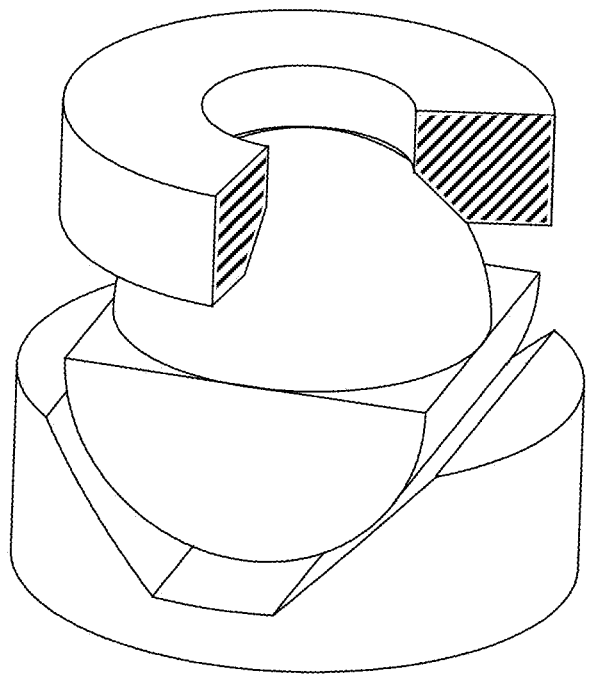
Figure 4 – Prior Art
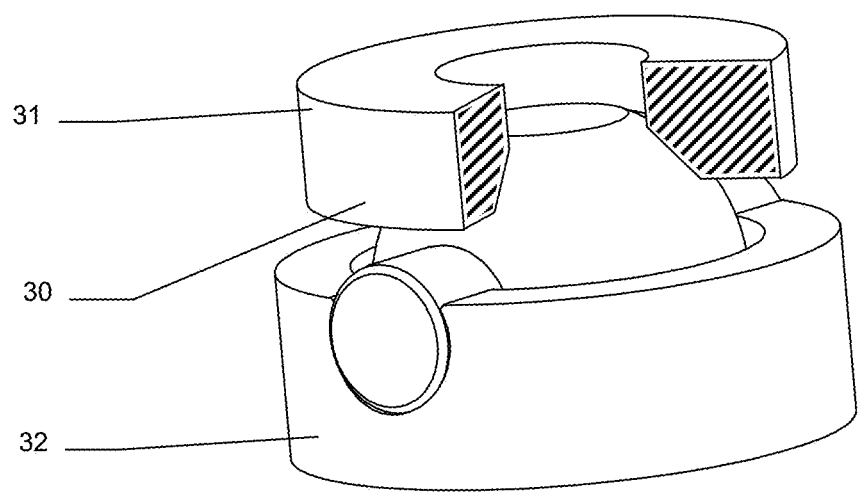
Figure 5 – Prior Art

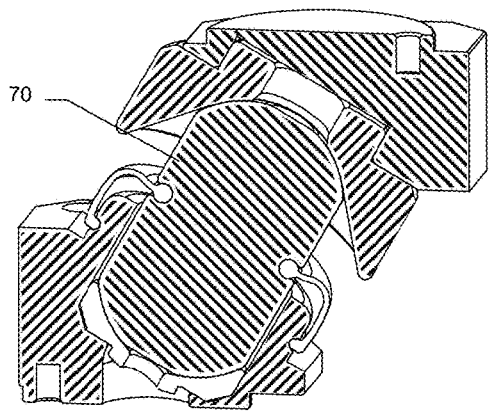
Figure 7A - Prior Art
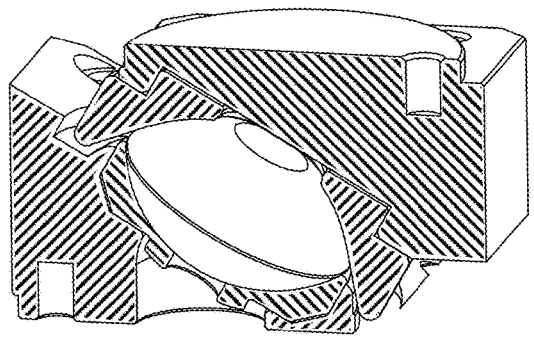
Figure 7B - Prior Art
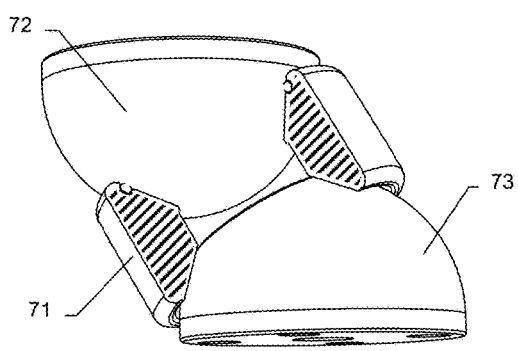
Figure 7C - Prior Art
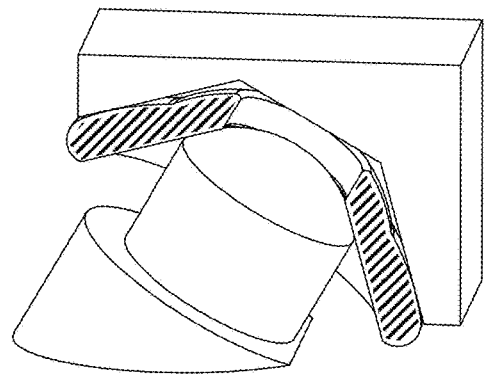
Figure 7D - Prior Art

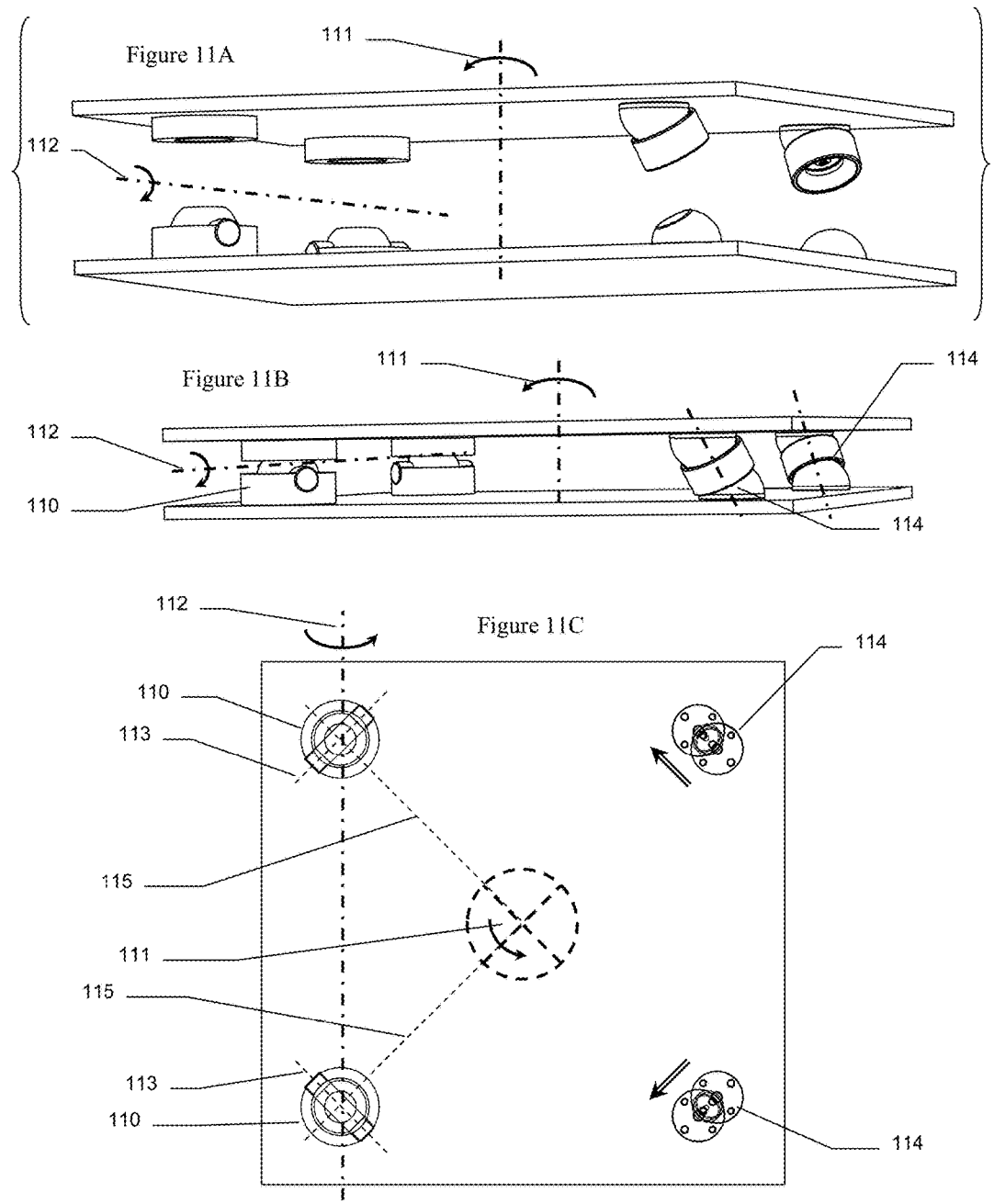

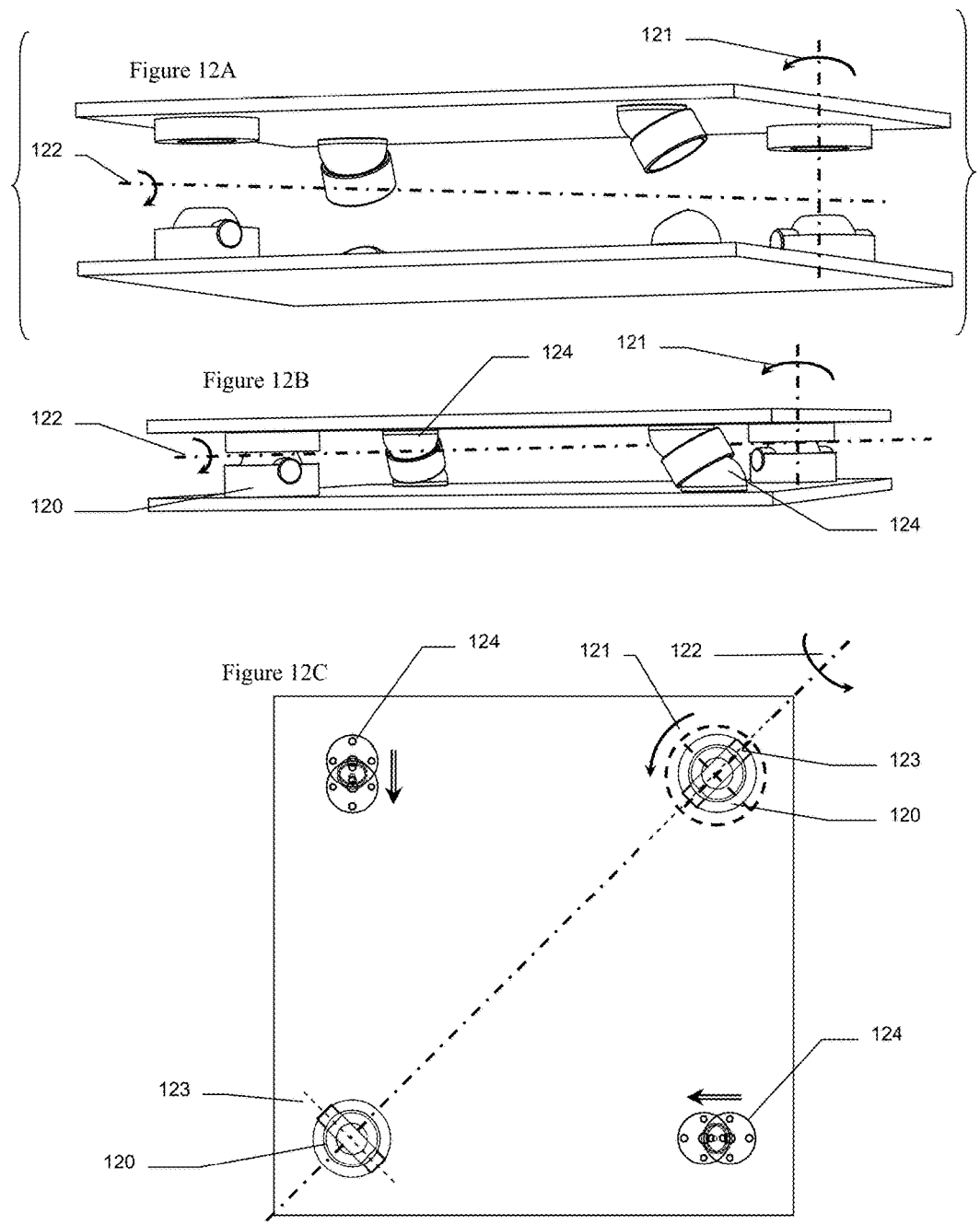

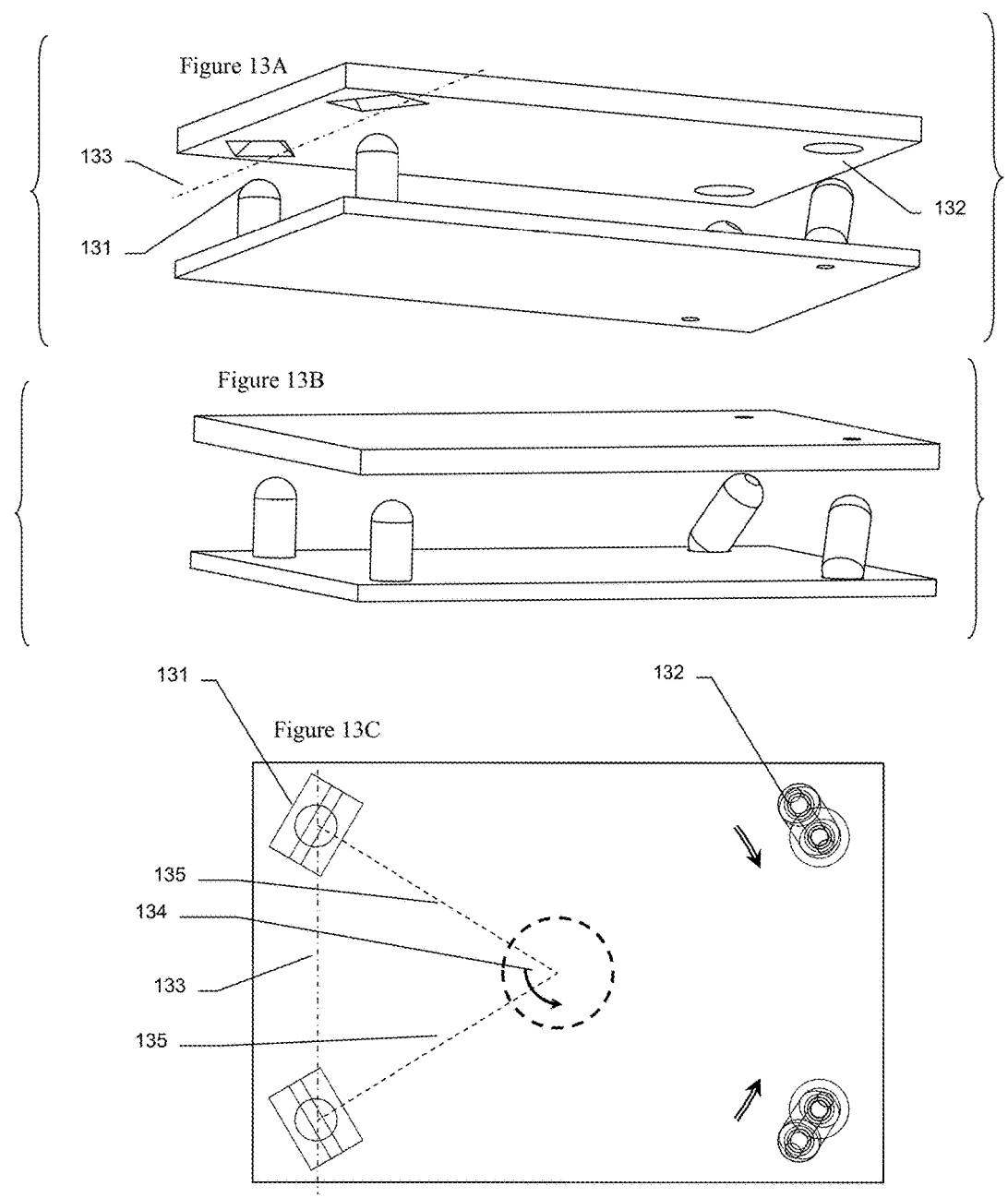

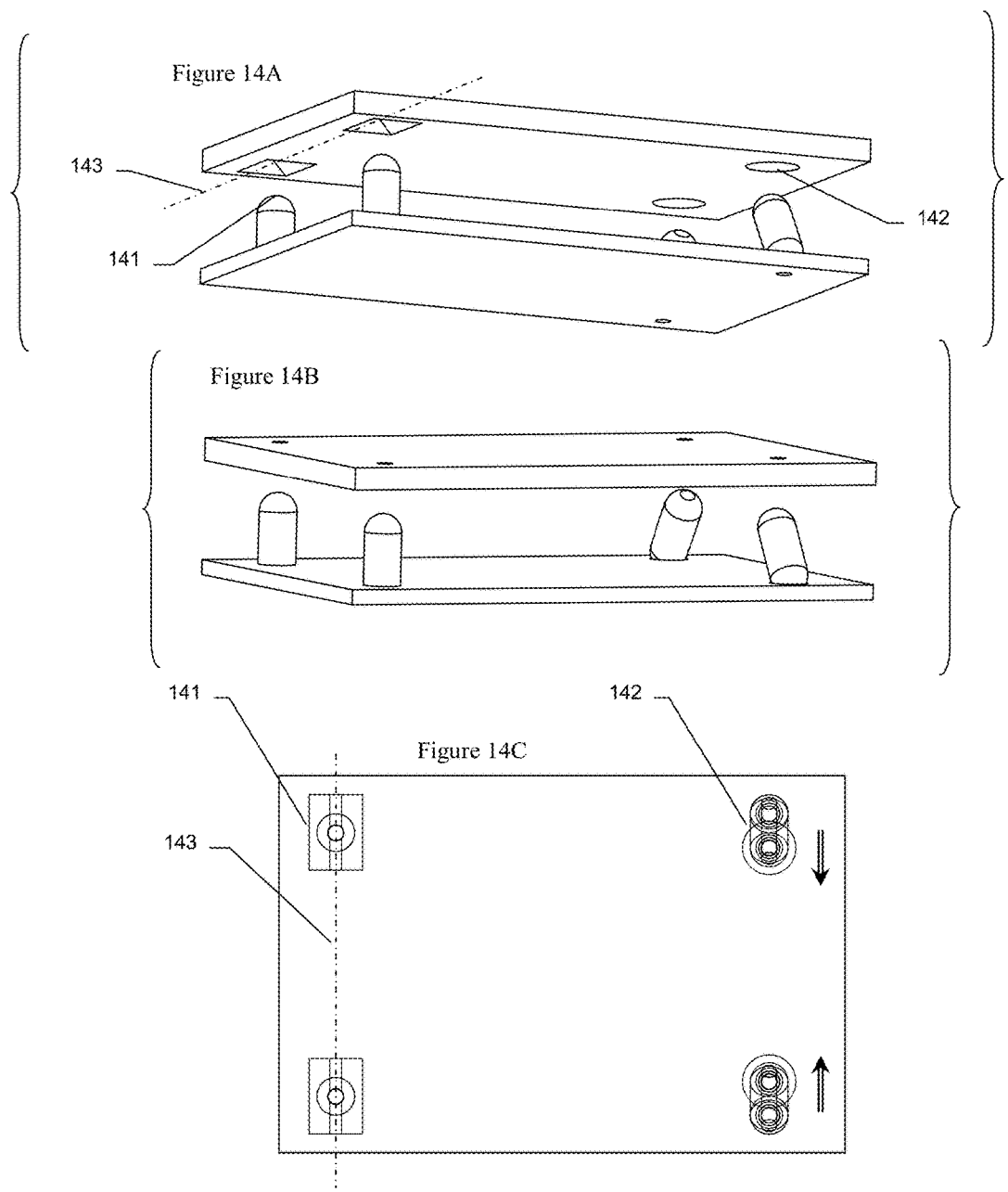

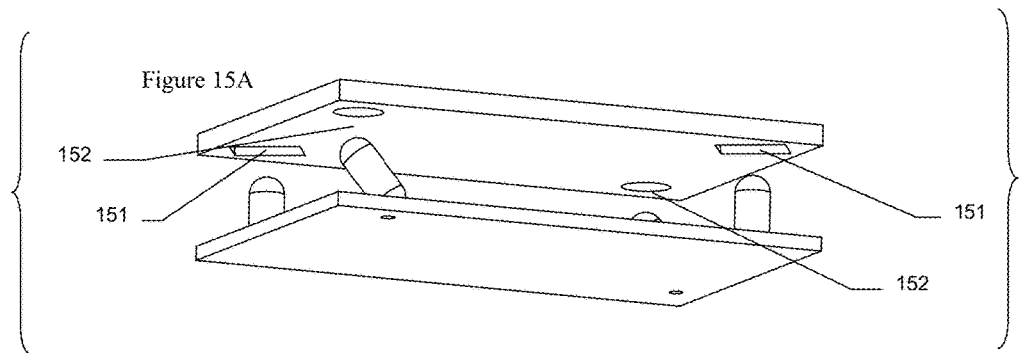
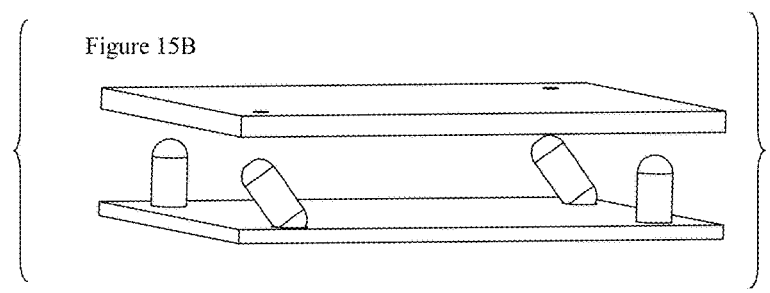
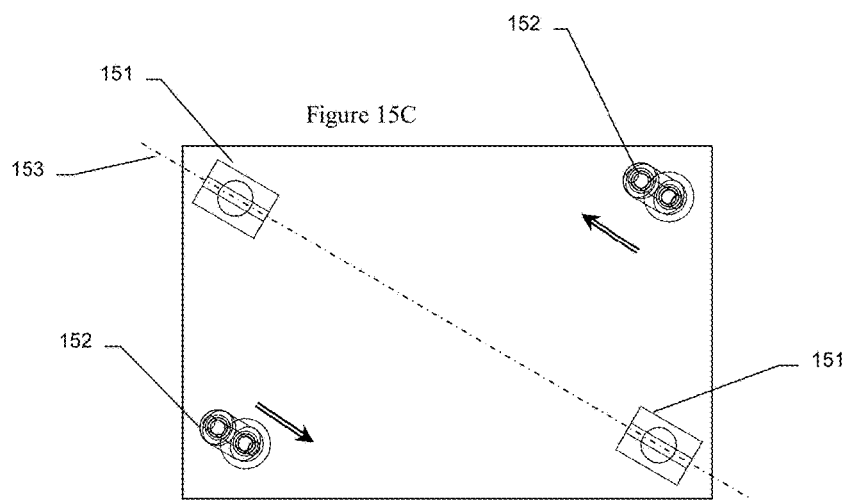

KINEMATIC MOUNT

CROSS REFERENCE TO RELATED APPLICATIONS

This application is the national phase of International Application No. PCT/US2014/033090, filed on Apr. 4, 2014, which claims priority benefit from U.S. Provisional Application Ser. No. 61/808,416, filed on Apr. 4, 2013, from U.S. Provisional Application Ser. No. 61/808,428, filed on Apr. 4, 2013, and from U.S. Provisional Application Ser. No. 61/928,993, filed on Jan. 17, 2014, the disclosure of all of which is incorporated herein in its entirety by reference.

BACKGROUND

1. Field

The present disclosure relates to the field of mechanical kinematic mounts.

2. Related Art

A kinematic mount (or coupling) is a mechanism that connects two subassemblies (referred to in this disclosure as subassemblies A and B) and constrains exactly all of the possible degrees of freedom (DOFs) between them. For any two free rigid subassemblies in three dimensions, there are six such DOFs—three translational and three rotational. When subassemblies are kinematically coupled, the coupling is stress-free and repeatable. The subassemblies can be complex structures, or simple rigid bodies.

A kinematic mount is comprised of "mating elements" that connect the two subassemblies. Each mating element is comprised of two mating "components"—one attached to each subassembly. The connection of the two subassemblies occurs when they are brought toward each other (with their pre-attached components of the mating elements) along a "mating direction" or "mating axis" until each pair of components connects to form its complete mating element.

Generally, the components of a mating element do not connect in a unique unambiguous way—they have "wiggle room" within them. It is the property of the entire kinematic mount (indeed, it is its underlying quality) that when all mating elements are engaged, it collectively eliminates all of the "Wiggle" in all of the mating elements, and does so in such a way as to not over-eliminate, or over-constrain then, so they are not "fighting each other".

The wiggle comes into play, for example, when one of the subassemblies warps or expands due to a change in temperature. Inside the mating elements, the components may shift within their wiggle room, but overall the kinematic mount will remain well-constrained, and no stresses will develop.

Typically the mating elements are located roughly on a plane that is perpendicular to the mating direction—the "Mating Plane".

Kinematic mounts are a special case of kinematic structures, which also constrain exactly six DOFs, but do not have the ability to come apart neatly and re-connect along a single direction, and so have to be assembled in place.

There are several reasons why Kinematic mounts are used.

If one subassembly is the foundation for an optical instrument, and the other subassembly is the optical instrument itself, then it is guaranteed that the instrument won't be warped by the foundation, even if the foundation (or instrument) warps as a result of temperature change, ground shift, or mechanical stress due to reason such as tilting of the foundation (as would be the case in a telescope that tracks stars across the sky)

Additionally, every time the mount is taken apart and put together, the subassemblies retain the same spatial relationship with respect to each other. In the case of the telescope, if the operator has several observation cameras that need to be used interchangeably, mounting them on a kinematic mount guarantees that on each use they'll return to the position they were at when last disassembled. Similarly, a robot that connects to a production tool using a kinematic mount is guaranteed that the tool is held in exactly the same way every time, and so does not have to be re-calibrated.

An important property of a kinematic mount is its load carrying capacity. In many implementations of kinematic mounts, because their structure relies on point contacts between spheres and flat surfaces, kinematic mounts are limited to very light loads, and are damaged if this load is exceeded because the spheres dent the flat surfaces. This is clearly a problem when a telescope camera weighs more than a ton, or the robot has to lift a roof of a car quickly into position.

Another important property is low friction. If a sphere presses into a flat surface, even before it permanently dents it and only elastically deforms it, it becomes difficult for the sphere to slide, since it has to "drag the elastic dent" with it.

Kinematic couplings are old art. For example FIGS. 1A and 1B illustrate a "cone-groove-flat" mount, subassembly A [10] has three spherical protrusions [11], and subassembly B [12] has a conical depression [13], a V-groove depression [14], and a flat area [15]. If the subassemblies are mated such that the spherical protrusions of subassembly A are tangent to the mating surfaces of the components of subassembly B, then the spatial relation between subassemblies A and B is unique —the conical depression eliminates three DOFs, the V-groove eliminates two DOFs, and the flat area eliminates the last of the six DOFs. These mating elements are each an example, respectively, of a 3-DOF, a 2-DOF, and a 1-DOF mating element.

A similar scheme is the "three-groove" mount (FIGS. 2A and 2B), in which three spherical protrusions in subassembly A [20] fit into three V-groove depressions in subassembly B [21], such that the spherical protrusions are tangent to the faces of the V grooves, eliminating two DOFs each. This mount has an advantage over the "cone-groove-flat" mount in that its three mating elements are identical, and so the mount is symmetrical. The three-groove mount is also a widely used mechanism.

In the two examples given above, the kinematic mounts are comprised of three mating elements. The components of the mating elements can be embodied as features that are formed directly into the subassembly (such as the groove and conical depressions in these examples) or as bodies that are mechanically attached to them (such as the spherical protrusions in these examples).

Another property of kinematic mounts is that the precise location of the components is not critical. As long as all pairs of components can contact each other simultaneously and form their respective mating elements, the mount will function and the assembly will be kinematic.

For example, in the case of the cone-groove-flat mount, it does not matter where a spherical protrusion fits along the axis of its matching V-groove, or within its matching flat area. This is the "Wiggle room" referred to earlier.

Similarly, in the case of the three-groove mount, the axes of the v-grooves do not need to precisely intersect at a single point, as long as they are pointing roughly towards a common center. A deviation of up to 15° from the centroid of the mating elements hardly detracts from the functionality of the mount. Only if one of the v-grooves is fabricated so far out of alignment that it points at (or nearly at) one of the other v-grooves does the mount fail to function properly.

This means that there is no need to require tight manufacturing tolerances to achieve the stress-free, and repeatable coupling. The tolerances on the shape of the individual components (spheres, cone, V-groove, flat) are assumed to be much tighter than the positional tolerances of the mating elements and so are assumed to be perfect. For example, the cone is assumed to touch the sphere along a circle (whereas an imperfect cone would touch the sphere in three points and might even be able to rock in it.) This is a practical and realistic assumption, since it is relatively easy to achieve these tolerances.

When designing the mating elements, it is important to consider that as the kinematic mount is assembled by moving its subassemblies toward each other in the Mating Direction, the components of the mating elements must be able to come together, in that direction, without interference.

The mating elements are only typically expected to work in compression, as if the bottom subassembly is attached to the floor, and the only force acting on the top subassembly is gravity. In this disclosure, when referring to a "top" and "bottom" subassembly, such an orientation is assumed.

However, in some situations, such as on a telescope that tilts from vertical to horizontal, an airplane that can fly upside-down, or on a vehicle that is bouncing on a rocky road, the mating elements might experience tensile forces, trying to pull them apart, and clearly the mating elements shown so far are unable to counteract such forces. (as are any mating elements that are based on a "seating" of one body within another)

In such cases either an external load is placed on the subassemblies to ensure that they are always loaded in compression, or a "retainer" mechanism is added to the mating element, which pulls its two components together to overcome any force that is trying to pull them apart. Such a mechanism must be compliant so as not interfere with the positioning functionality of the mating element.

For example, if the two components of the mating element were magnetic, or if magnets were embedded in the subassemblies right near the mating element locations, such that the magnets almost touch each other when the mating elements are assembled, then that would constitute a retainer. This practice is sometimes used, but usually magnetic retainers are not considered secure enough since a sharp jolt can disengage them, and mechanical retainers are used instead.

The design of a kinematic mount can often be divided into its abstract geometry (How many and which DOFs are eliminated at each mating element) and into the embodiments or implementations of its mating elements (Is the 2-DOF mating element implemented as a sphere-in-groove or is some other mechanism used?).

Of the first aspect, a common property of existing mounts is that they each rely on three mating elements. The underlying assumption is that a four-legged kinematic mount is not feasible for the same reason that a four-legged restaurant table rocks on an uneven floor, whereas a three-legged table is always stable. This assumption, however, is only relevant to kinematic mounts if they decouple any in-plane motion from out-of-plane motion, as existing art mounts do. (For example, the motion of the spherical protrusion inside the V-groove is purely horizontal, and does not result in vertical motion)

A different way to phrase this is that the restaurant table is assumed to be free to move in the plane of the floor (X-Y-Theta) and so only three DOFs need to be constrained (tip-tilt-Z). Because of this, after three legs impose one DOF constraint each, any additional legs result in an over-constrained system which results in rocking since unless one leg is in the air, the system has no solution. However, a 3D spatial assembly has six DOFs to constrain, and so there is no theoretical impediment to creating a mount using more than three mating elements.

It is in fact possible to create a four-mating-element kinematic mount by combining in-plane and out-of-plane motion—which is something a typical restaurant table does not do. This coupling of in-plane and out-of-plane is very important, and explained further below.

The utility of a four-legged kinematic mount is that most real life subassemblies—such as optical plates, boxes, cars, and washing machines—are rectangular in shape and so are naturally assembled or held using four mating elements rather than three.

In this disclosure, the term "Pivot" refers to a mating element that constrains exactly three translational DOFs, allowing only rotational DOFs. The Pivot constrains two points, each fixed in relation to one of its components, to remain coincident.

In this disclosure, the term "Slider" refers to a mating element that constrains exactly two translational DOFs, allowing rotational DOFs and one translational DOF. The Slider allows a point that is fixed in relation to one of its components to move along a one-dimensional curve that is fixed in relation to the other components.

In this disclosure, the term "Spacer" refers to a mating elements that constrain exactly one translational DOF, allowing rotational DOFs and two translational DOFs. The Space maintains a fixed distance between two points, each of them fixed in relation to one of the components of the Spacer.

Of the second aspect, implementing the mating elements in such a way that they function well in practical situations can be complicated, especially in regards to load carrying capacity and friction.

In this disclosure, the term "Conoid" refers to a body with an internal concave surface of revolution (or a portion thereof) that is generated by revolving a straight line or a concave curve, in such a way that if a matching solid sphere is pushed into it, the contact area will be a circle or a portion thereof, perpendicular to the axis of revolution, and centered on it, and the Conoid surface will be tangent to the sphere.

In this disclosure, the term "Spheroid" refers to a body with an external convex surface that is a sphere or a portion thereof a sphere.

In this disclosure, the term "CS Pair" or "CS interface" refers to a matching Conoid-Spheroid pair. The main property of a CS pair is that the Conoid can rotate freely around the center of the Spheroid in all three axes. (Or alternatively, the Spheroid can rotate within the Conoid)

CS Pairs are great building blocks for mating elements since they have a high load carrying capacity, and the rotation of the Spheroid within the Conoid has very low friction. Also, since both parts are bodies of revolution, they can be manufactured easily and with high fidelity using a lathe.

It is best to fabricate a CS Pair such that the Spheroid is both stronger and more rigid than the Conoid. This cause any deformation (whether elastic or plastic) to occur in the Conoid, while the Spheroid remains undeformed and spherical, reducing any impediment to motion.

The easiest type of mating element to implement is the Pivot. FIG. 3 shows one implementation, using a single CS Pair. A Spheroid [30] is attached to subassembly A [32], and a Conoid [31] is attached to subassembly B [33]. The interface between them allows subassembly B to rotate around the center of the spherical surface, but does allow it to move.

A Pivot can also be implemented (for example) using a plain spherical bearing or other common mechanisms.

The implementations of Slider mating elements are more problematic. A common problem with them is that they often involve mechanical single point contacts, as in the contact between a spherical protrusion and a V-groove or a flat. Point contacts are limited in the amount of load they can hold. Beyond a certain limit, the stress concentration permanently deforms the mating surfaces, and the deformed parts no longer function properly.

In U.S. Pat. Nos. 6,729,589 and 7,173,779 is described a Slider mating element comprised of spherical and cylindrical surfaces (A "Spherolinder") that interface a V-groove and a conical depression without creating point contacts, only line contacts (FIG. 4). The Spherolinder mating element behaves very similarly to a sphere-in-groove mating element, but greatly increases the load carrying capacity.

In U.S. patent application Ser. No. 13/032,607 is described a different ("Bead") mating element that achieves a similar result, but is easier to fabricate since it replaces the V-groove feature with a round shaft (FIG. 5).

Both these inventions create an equivalent mechanism to a sphere sliding inside a V-groove, along a straight line. However, it is not absolutely necessary for the sphere to move along a straight line. It is only important that it travels along a one dimensional construct, and so if the Sphere travels along an arc, for example, the mating element will still be a Slider, and function correctly within the context of a kinematic mount. Such a Slider implementation is described further below.

Using this definition, the three-groove mount of FIGS. 2A and 2B is a special case of a three-Slider mount, as are the three-Spherolinder mount and three-Bead mount referred to above.

In both the disclosures mentioned above, the Spherolinder and Bead mating elements are used to replace ball-in-V-groove Slider elements within a traditional three-Slider kinematic mount, resulting in an otherwise identical mount, but with higher load carrying capacity. However they can also be used in other kinematic mount configurations, such as the four-legged mounts described below.

The implementation of Spacers is relatively straight forward, and is often used in context others than kinematic mounts. Conceptual cross-sections for some Spacer geometries are shown in FIG. 6 (All bodies shown are bodies of revolution), and embodiment of some Spacer implementations are shown in FIG. 7.

The simplest of these is a pair of spheres [6A] ("BiSphere") that constrains the distance between two points on opposite sides of the mate. The BiSphere mating element clearly relies on single points of contact and so has a low load carrying capacity.

Other Spacer implementations include "Pill" [6B, 7A], "Lens" [6C, 7B], "Collar" [6D, 7C], and "Hat" [6E, 7D]. These are all able to carry higher loads compared to the BiSphere since they replace point contacts with CS interfaces by adding a mediating body that constrains the distance between two virtual centers (shown as center marks).

Each Spacer constrains this distance even as the two subassemblies move in relation to each other, but does not have to operate in all possible orientations—it suffices that it can operate as the two subassemblies move small distances around the nominal assembled position. The direction along which force is transferred in this nominal position is called the Spacer Axis of the Spacer and is shown as a dash-dot line in FIG. 6, and the constrained distance is labeled as "d".

The angle between the Spacer Axis and the Mating Axis is called the "Tilt Angle" of the Spacer.

In most of the elements described above, there are movable mediating bodies that are introduced in order to eliminate point contacts and increase the load capacity of the mating element. These bodies also add their own DOFs to the system, but since their final position is not of significance to the kinematic mount, this does not require additional constraints in the system. Also, in practical implementations, the mediating bodies are loosely retained to one of the subassemblies of the mount so that they do not fall off when the subassemblies are moved around.

Loads acting on the assembly along the Mating Axis are called Axial loads, whereas loads acting in perpendicular directions are called Side loads. It is often the case that Axial loads are higher than Side loads, especially when the Mating Axis is vertical and the loads are primarily due to gravity.

In their physical embodiments, the mating surfaces of all these elements can be made from hardened metals such as steel or from hard ceramics or carbides, but can also be made from softer materials such as Aluminum or plastics.

In all kinematic mounts, there are six mechanical constraints that can be described by 6 equations, based on the mount's geometry. For the mount to function, the six equations must be independent. Taking only small deviations around the mount geometry, the six equations can be described as linear equations, and can thus be described by six vectors, forming a matrix. In theory, in order for the mount to function, the matrix must be invertible (non-singular). In practice, if the matrix is close to singular (known as "ill conditioned" matrices), the mount is highly non-rigid or unstable and so considered non-functional. This reasoning applies to the specification below, so when, for example, two direction vectors are specified to be "non-parallel" or "non-perpendicular", the practical meaning is that even configurations where the vectors are close to being parallel or perpendicular (respectively) are disallowed. A minimum angle of 20° between vectors is generally enough to make sure they are sufficiently non-parallel, with 30° being preferable.

SUMMARY

The following summary of the disclosure is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Aspects of this invention include kinematic mounts comprising more than three mating elements. In order to function properly, the sum total of DOFs constrained by the mating elements must be six. Since a majority of real-life subassemblies are rectangular in shape, the most utility is derived from mounts that comprise four mating elements—for example a Pivot and three Spacers, or two Sliders and two Spacers.

Aspects of this invention include a "Collar" Spacer mating element that constrains one degree of motion between mated subassemblies. A Collar mating element consists of a body with two conical depressions mated between two spheres and tangent to them. It is easy to fabricate, provides a high load capacity, and constrains the distance between the centers of the spheres to be a constant value. If one of the spheres is considered to be fixed in space, the center of the other sphere thus describes a (larger) spherical surface centered around it.

Aspects of this invention include a "BiTapered" snap-ring connector for attaching and centering circular bodies, used to attach the spherical body of a Collar or BiCollar mating element to its mounting plate.

Aspects of this invention include a "BiCollar" Slider mating element that constrains two DOFs between mated subassemblies. A BiCollar mating element consists of two Collar mating elements (FIG. 6D, FIG. 7C) sharing one of their spherical bodies. The shared body, whose center's distances from the centers of the other two spherical bodies is thus constrained to move along an arc. Since the Collar (which serves as the building block for the BiCollar mating element) consists of simple bodies of revolution, it is easy to fabricate and provides a high load capacity.

According to aspects of the invention, a kinematic mount is disclosed, connecting two subassemblies along a mating direction, comprised of four mating elements, each mating element having two components, each attached to a different subassembly, one of said mating elements being a Pivot mating element constraining three degrees of motion, and the other three of said mating elements each being a Spacer mating element having a Spacer axis and constraining a single degree of motion, said mating elements configured to jointly constrain six independent degrees of motion. At least one of said Spacer mating elements is embodied as one of a Collar, a Pill, a Lens or an adjustable Collar mating element. The angle between each of said three Spacer Axes should be at least 20°, or alternatively at least 30°. The Spacer Axes of said Spacer mating elements are tilted between 15 and 45 degrees, or alternatively between 20 and 30 degrees, from the mating direction. The Spacer Axes of said Spacer mating elements are configured so that the set of vector cross products between each Spacer Axis and the line connecting the same Spacer and the Pivot mating element form a linearly independent set.

According to further aspects, a kinematic mount is disclosed, connecting two subassemblies along a mating direction, comprised of four mating elements, each mating element having two components, each attached to a different subassembly, two of said mating elements being Slider mating elements each having a Slide Axis and constraining two degrees of motion, and the other two of said mating elements each being a Spacer mating element each having a Spacer Axis and constraining a single degree of motion, said mating elements configured to jointly constrain six independent degrees of motion. At least one of said Slider mating elements is embodied as a Spherolinder, a Bead, a ball-in-groove, a BiCollar, or an adjustable BiCollar mating element. The Spacer mating elements is embodied as a Collar, an Adjustable Collar, a Pill, or a Lens mating element. The angle between each of said three Spacer Axes should be at least 20°, or alternatively at least 30°. The Slider Axes of said Slider mating elements are collinear and may also be non-parallel. The projections of each Spacer Axis onto the mating plane is perpendicular to the arm leading from the Spacer to the intersection of the two Slider Axes.

According to further aspects, a Slider mating element is disclosed, constraining two degrees of freedom between a first and second subassemblies, and comprised of a first and second Spheroids attached to said first subassembly, third Spheroid attached to said second subassembly, first Collar body that is tangent to first and third said Spheroids, and second Collar body that is tangent to second and third said Spheroids.

According to yet further aspects, a kinematic mount is disclosed, connecting two subassemblies along a mating direction, and comprised of three Bicollar Slider mating elements each having a Slider Axis.

According to further aspects, a Slider mating element is disclosed, constraining two degrees of freedom between a first and second subassemblies, and comprised of a first and second Spheroids attached to said first subassembly, third Spheroid attached to said second subassembly, first Collar body that is tangent to first and third said Spheroids, and second Collar body that is tangent to second and third said Spheroids. The Slider mating element may contain retaining features configured to keep first Collar body loosely attached to said first Spheroid, and second Collar body to said second Spheroid. At least one of said Spheroids may be a truncated sphere, a belted sphere, a ringed sphere, or an Adjustable Collar.

Other aspects and features of the invention would be apparent from the detailed description, which is made with reference to the following drawings. It should be appreciated that the detailed description and the drawings provides various non-limiting examples of various embodiments of the invention, which is defined by the appended claims.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

FIGS. 1A and 1B: Cone-V-Groove mount (Prior art)
FIGS. 2A and 2B: 3-groove mount (Prior art)
FIG. 3: CS pair (Prior art)
FIG. 4: Spherolinder mating element (Prior art)
FIG. 5: Bead mating element (Prior art)
FIGS. 7A-7D: Spacer implementations (Prior art)
FIGS. 1, 10A and 10B: 3-1-1-1 mount using CS and Collar mating elements
FIGS. 11A-11C: 2-2-1-1 mount using Bead and Collar mating elements
FIGS. 12A-12C: 2-1-2-1 mount using Bead and Collar mating elements
FIGS. 13A-13C: 2-2-1-1 mount using Sphere-in-groove and Pill mating elements
FIGS. 14A-14C: 2-2-1-1 mount using Sphere-in-groove and Pill mating elements (parallel)
FIGS. 15A-15C: 2-2-1-1 mount using Sphere-in-groove and Pill mating elements (diagonal)
FIGS. 20 and 20A: Complete sphere and clip ring

DETAILED DESCRIPTION

4-Point

Figure 6A:
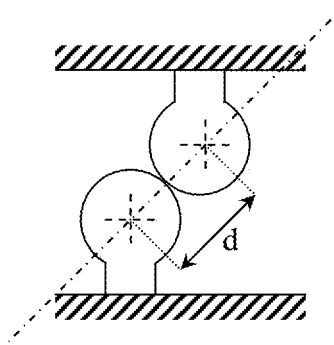
FIGS. 6A-6E: Spacer geometries (Prior art)

Aspects of this invention include kinematic mounts comprising four mating elements ("four-legged"). In order to function properly, the sum total of DOFs constrained by the mating elements must be six. Divided among four mating elements, there are only two options to do this: a Pivot and three Spacers, or two Sliders and two Spacers. However, this is only a necessary condition, not a sufficient one, and any attempt to build a four-legged kinematic mount based only on these necessary conditions would fail—which is why current art only has three-legged kinematic mounts.

Conditions are shown under which the four-legged mounts are kinematic, stable and can be assembled from one direction.

As explained above, in order to have a kinematic mount that uses four mating elements, it is required that the in-plane (X-Y-Theta) and out-of-plane (Z-tip-tilt) DOFs are considered together and not separately, or else the problem becomes similar to the four-legged restaurant table.

Before describing embodiments of the invention, we first enumerate the conditions that are levied on the mount.

The underlying condition for a kinematic mount is that the mathematical equations describing the mechanical constraints resulting from the mating elements must form a set of six independent equations. Usually, when taking a linear approximation of the equations, this results in six directional vectors representing the constraints, which must then form a linear mutually-independent set. ("independent" is used in the linear (vector) algebra sense)

Additionally, it must be guaranteed that the mating elements are able to mate properly when the mount is assembled along the Mating Axis, which means there's no mechanical interference during the assembly process.

Finally the mount needs to be structurally efficient in countering both Axial loads and Side loads.

When considering a CS pair (as in the case of the Pivot, FIG. 3), it is clear that the load carrying capacity of the mount is related to the half-angle of the cone. A very flat cone (approximating a flat plate) only contacts the sphere along a very small circle at the top. A very narrow cone (approximating a cylinder) contacts the sphere along a circle near its equator, at an angle that can hardly transmit any force in the direction of the axis of the cone. The optimal half-angle for the cone from this perspective is 45° (a "right-angle" cone), but any half-angle between 30° and 60° is still close enough to be able to hold most of the load that the right angle cone can.

When considering a Spacer (e.g. the Collar of FIG. 6D), it is also clear that if it has a non-zero Tilt Angle, its Axial load capacity is further diminished (relative to that of the CS pair) by a factor of the Cosine of the Tilt Angle, and a Side load of magnitude the Sine of the Tilt Angle is generated by it. Tilt Angles of over 45° are impractical, since they generate Side forces that are too large. Tilt Angles of under 15° are also impractical since they bring the Spacers too close to parallel, which interferes with the functionality of the mount, as explained below. Tilt Angles in the range of 15° to 45° are practical, with the best results between 20° and 30°.

Also, the requirement that the Collar can be assembled in the Mating direction means that the Tilt Angle must be smaller than the half-angle of the cone of the Collar. Similar logic applies to the Pill, Lens, and Hat geometries.

Embodiments of this invention can use elements described in "prior art" to implement the Pivot, Sliders, and the Spacers, or potentially use novel mechanical mating elements that perform the same functions. Since the requirements on the mating elements largely pertain to their locations and to the direction of their axes, the mating element embodiments are largely interchangeable. That is, the Pivot can be equivalently embodied as a CS Pair or any other Pivot type, each of the Sliders can be equivalently embodied as a Spherolinder, Bead, or other Slider type, and each of the Spacers can be equivalently embodied as a BiSphere, Collar, Pill, or any of the Spacer types.

4-Point—3-1-1-1

Figure 8A:
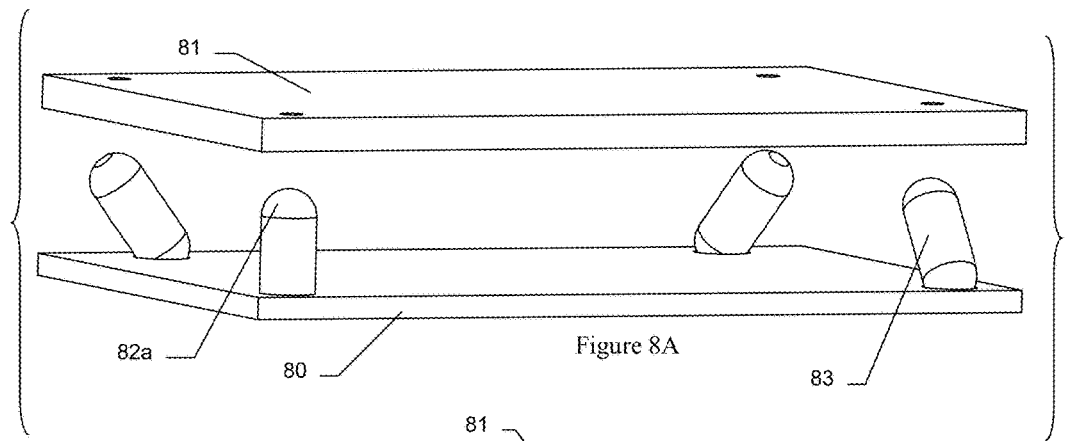
FIGS. 8A-8C: 3-1-1-1 mount using CS and Pill mating elements
Figure 8B:
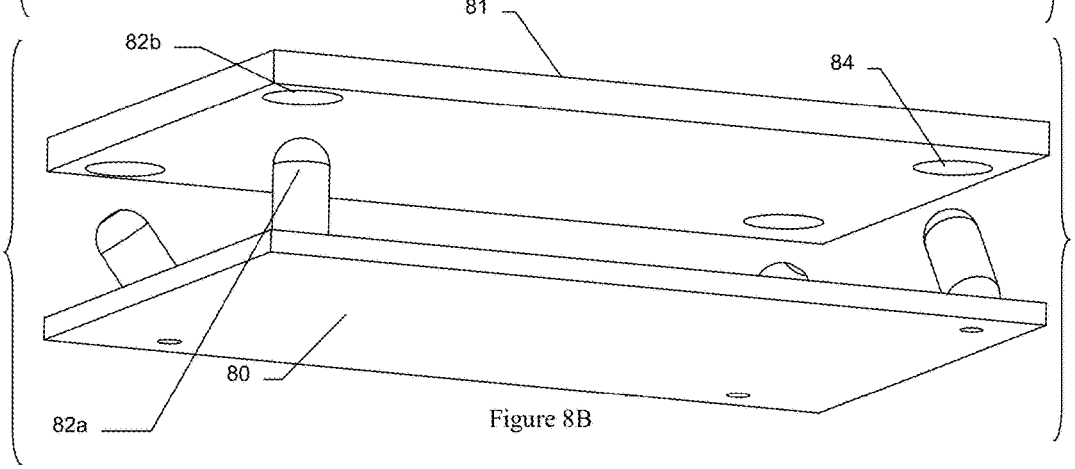
Figure 8C:
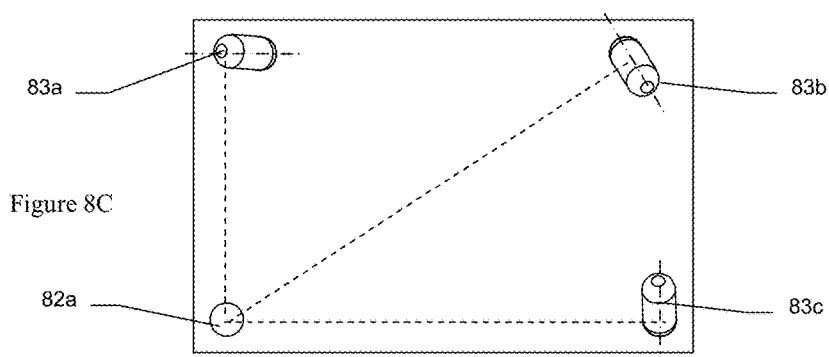
Figure 9A:
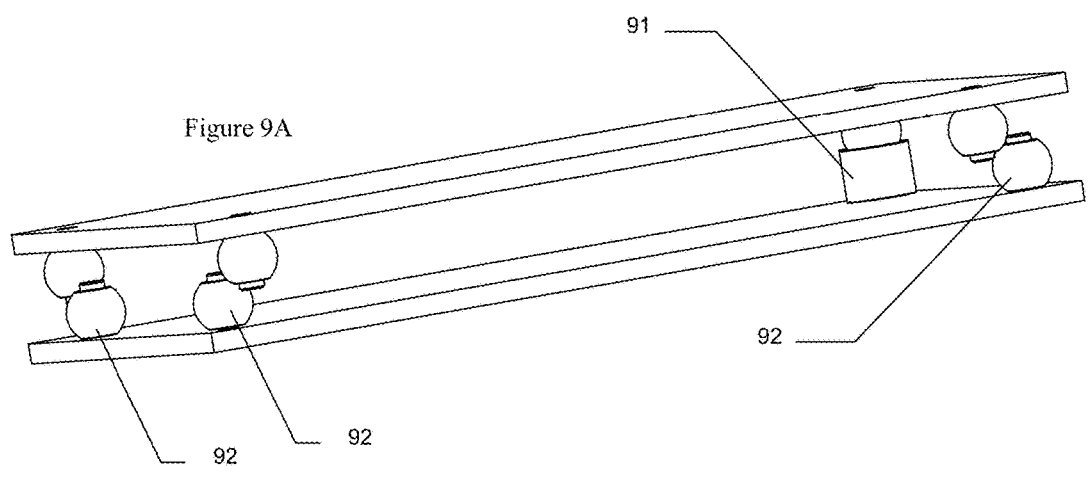
FIG. 9A-9B: 3-1-1-1 mount using CS and BiSphere mating elements
Figure 9B:
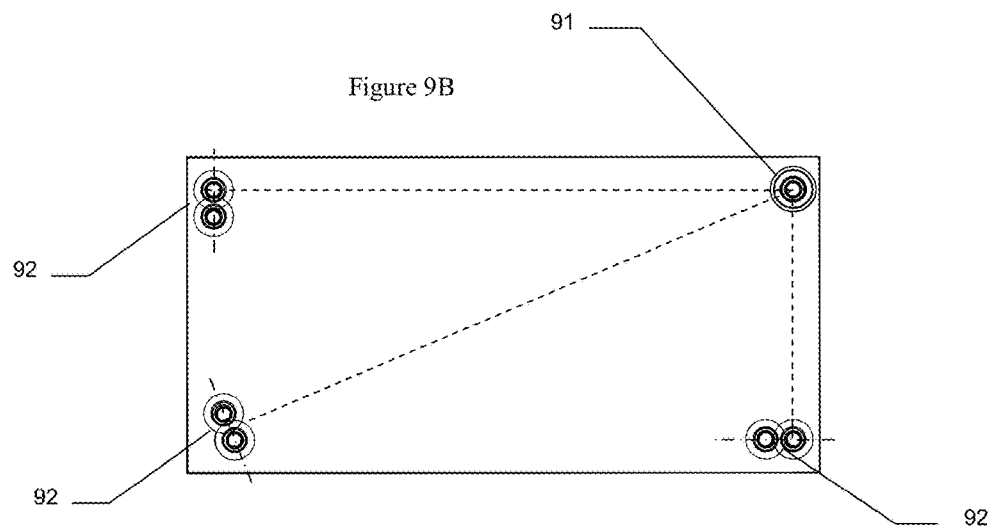
Figure 10:
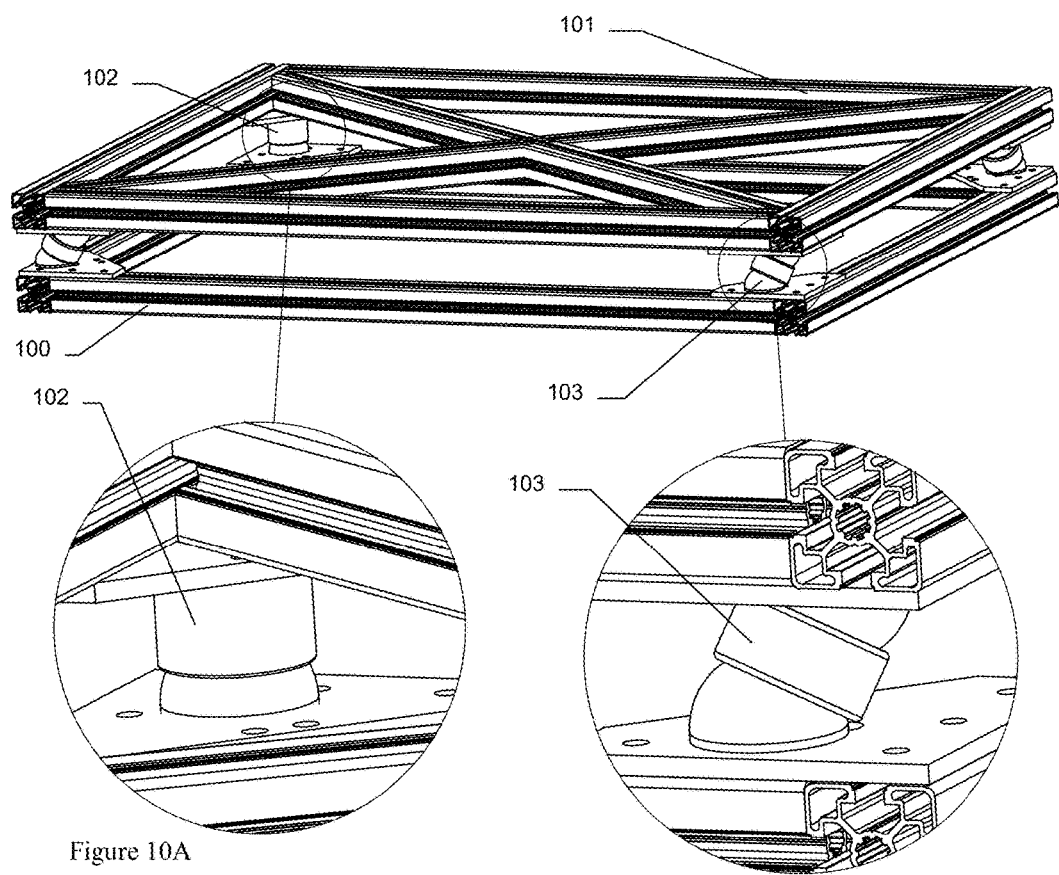

FIG. 8-FIG. 10 depict embodiments of the invention in which the kinematic mounts use one Pivot and three Spacer mating elements, together constraining exactly six DOFs. In order to function correctly, there are numerous requirements imposed on the location and orientation of the mating elements. The Mating Axis is perpendicular to the flat subassemblies as depicted in the drawings.

The description below applies to all three figures. A detailed per-figure description follows.

The Pivot [82, 91, 102] serves as a reference and is located in an arbitrary position. Since the Pivot is isotropic, there are no constraints on its orientation, other than that it be able to assemble along the Mating Axis. In the case of a CS Pair, this is trivial since the Conoid can be placed so its axis is parallel the Mating Axis.

Once engaged, the pivot eliminates three translational DOFs, allowing the top subassembly only to rotate in the mating plane, tip, and tilt.

These three remaining unconstrained rotational DOFs are now constrained, simultaneously, by properly positioning the Spacers [83, 92, 103] in relation to the Pivot. Each Spacer can apply a force only along its Spacer Axis, and so can only apply a torque relative to the Pivot in the direction which is the vector cross product of its own Spacer Axis and the line connecting its position with the pivot.

It is convenient to describe the direction of the Spacers in terms of the Tilt Angle and "Azimuth Angle" (measured around the Mating Axis).

To function kinematically, the three torque vectors must form a linearly independent set of vectors. For example, if all three Spacer Axes are parallel the Mating Axis, then all three torques directions will be co-planar and thus linearly dependent, and the mount will fail. Similarly, if two torque axes are parallel, they are linearly dependent, and again the mount will fail. These conditions must be avoided when positioning and orienting the Spacers.

Therefore a Tilt Angle of at least 15° is desired, and a set of Azimuth angles that ensure that the Spacer Axes are at least 20° from each other (and preferably 30°), so that the Spacer Axes are sufficiently far from being parallel to each other.

Further, as explained above, the Tilt Angle should be no larger than 45°, in order to effectively support Axial loads, and the cone half-angle must be larger than the Tilt Angle in order to allow unobstructed assembly along the Mating Direction.

Therefore a Tilt angle in the range of 30°±15° is an acceptable design range, with cone half-angle in the range of 45°±15°, and still having the cone half-angle larger than the Tilt Angle.

Note that these conditions preclude the use of Spacers that are aligned in the vertical (or near vertical) direction, as is intuitive to do. The Spacers must be tilted quite significantly (though not too much), and angled relative to each other.

Figure 6B:
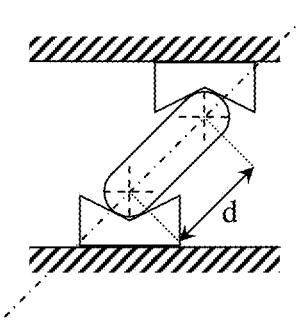
Figure 6C:
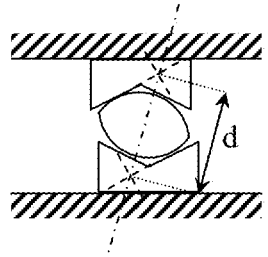

FIG. 8 shows an embodiment of the invention in which the Pivot is implemented as a CS pair (FIG. 3), and the three Spacers as Pill mating elements. (FIG. 6B and FIG. 7A). The mount connects subassembly A [80] and subassembly B [81]. The Pivot is embodied as a single CS interface [82a, 82b] (the protrusion is solidly attached to subassembly A [80]). Each Spacer is embodied as a "Pill" type Spacer, where the Conoids [84] are machined into subassemblies A and B, and the mediating Pill bodies [83a, 83b, 83c] are simply placed between them. The Spacer Axes are shown as dash-dot lines, and lines between them and the Pivot are shown as dashed lines.

Further, to keep the Spacers in compression, they are oriented so that the torques they apply act in opposing directions. That is, in top view (FIG. 8C), the diagonal Spacer [83b], exerting a torque clockwise, counters the two orthogonal Spacers [83a, 83c] that exert a torque counterclockwise.

FIG. 9 shows an embodiment of the kinematic mount in which the Spacers are implemented using the BiSphere Spacer mating element. The Spacers therefore utilize point contacts, and subsequently this design has a lower load capacity.

As before, it is not the BiSphere Spacer implementation that is the core of the invention, but the configuration of the Pivot mating element [91] and the three Spacers [92], with their Force Axes oriented so as to have a significant force component in the Axial load direction, and applying mutually-independent torques so as to make the mount kinematic. The Spacer Axes are shown as dash-dot lines, and lines between them and the Pivot are shown as dashed lines.

Figure 6D:
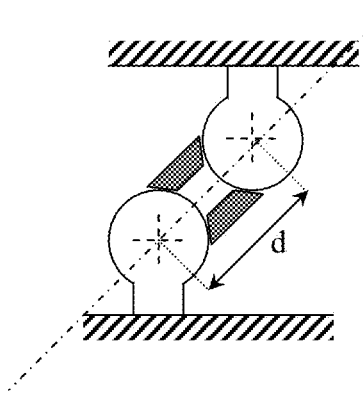
Figure 6E:
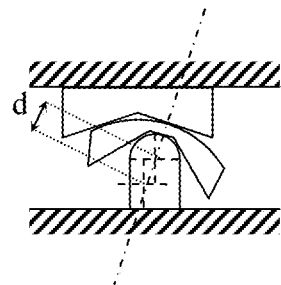

FIG. 10 shows an embodiment of the kinematic mount using Collar Spacer mating elements (FIG. 6D, FIG. 7C). Just like the Pill, the Collar mimics the BiSphere mating element, keeping the distance between the centers of the balls constant, but replaces the point contact with annular line contacts, as facilitated by the annular double-cone mediating body of the element. The Collar element is more compact, however. The mount connects subassembly A [100] with subassembly B [101], using one CS pair Pivot mating element [102] and three Collar-type Spacer mating elements [103]

The embodiments of the individual Pivot and Spacers, in and of themselves, are not at the core of this invention. It is the specific combination of a Pivot mating elements and three Spacer mating elements, and their locations and orientations that underlie this embodiment of the invention. The orientation and placement of the mating elements is independent of their embodiment, and the considerations for selecting them remain the same across embodiments.

4-Point—2-2-1-1

FIG. 11-FIG. 15 depict embodiments of this invention in which the kinematic mounts use two Sliders and two Spacer mating elements, together constraining exactly six DOFs. In order to function correctly, there are numerous requirements imposed on the location and orientation of the mating elements. The Mating Axis is perpendicular to the flat subassemblies as depicted in the drawings.

The description below applies to all five figures. A detailed per-figure description follows.

The geometry of the mount is best explained by first considering the two Slider mating elements [110, 120, 131, 141, 151]. Once engaged, since each Slider constrains two DOFs, in all but degenerate cases, only two DOFs between the two subassemblies remain unconstrained—an out-of-plane rotation, and an in-plane motion.

The "out-of-plane" rotation occurs around the line connecting the two Sliders [112, 122, 133, 143, 153].

The "in-plane" motion is determined by the relative orientation of the Slide Axes of the Sliders, and can be either a rotation or a translation.

In the general case, the Slide Axes are not parallel, and the in-plane motion is a rotation around a point defined by the intersection of two "mid normal" lines [115, 135], each emerging from the center of each of the Sliders and perpendicular to the projection of the Slider's Slide Axis on that plane. The center of rotation is marked as [111, 121, 134].

If the Slide Axes are collinear, however, then effectively the center of rotation for in-plane motion is at infinity, and the in-plane motion becomes translation, along the shared line [143, 153]

The two remaining unconstrained DOFs are then constrained, simultaneously, using two properly located and oriented Spacer mating elements [114, 124, 132, 142, 152].

As before, it is convenient to describe the direction of the Spacers in terms of the Tilt Angle and the Azimuth Angle.

The two Spacers solve the two last DOFs simultaneously—each of the Spacer Axes has force components that constrain a linear combination both of the DOFs, and so (as was the case with the three Spacers in previous embodiments) their torque vectors must be linearly independent.

To constrain the out-of-plane rotation DOF effectively, both Spacer elements must have Tilt Angle less than 45°, to ensure that they have a large enough force component in the Mating Axis direction to support the load without generating too large of a Side load. As explained above, they also need to have a Tilt Angle of more than 15°, and have an angle between them of over 20° (and preferably over 30°) in order for them not to be too close to parallel to each other. As before, best results are achieved with Tilt Angles between 20° and 30°.

To constrain the in-plane motion effectively, both Spacer elements must apply a force perpendicular to the arm between them and the center of rotation (in the first case) or parallel the direction of translation (in the second care), and must act in opposite directions. Thus their Tilt Angles must be large enough to have a significant in-plane force component, which effectively means at least 15°.

Finally, to ensure they assemble along the Mating direction, the Tilt Angles should be smaller than the half-angle of the Conoids of any CS pairs used in the Spacers.

FIG. 11 shows an embodiment of the invention in which the elements are roughly planar, and the two Sliders [110] are placed on adjacent corners of the quadrangle. FIG. 12 shows an embodiment of the invention in which the elements are roughly planar, and the two Sliders [120] are placed on opposite corners of the quadrangle. In both these embodiment, the Sliders are implemented as Beads, and the Spacers [114, 124] are implemented as Collars.

The Sliders [110, 120] are located so that their Slide Axes [113, 123] lie in said Mating Plane, and are not collinear (A minimum angle of 30° is used). The two remaining unconstrained DOFs are shown: the out-of-plane rotation axes [112, 122] and in-plane rotation axes [111, 121].

In the embodiment shown in FIG. 11 the center of in-plane rotation [111] is located approximately at the center of the mount, whereas in the embodiment shown in FIG. 12 the center of in-plane rotation [121] is collocated with one of the Sliders. In FIG. 12, the line between the Sliders [123] is collinear with the Slide Axis of one Slider.

The two Spacers [114, 124] are positioned based on the orientation of the sliders. The Tilt Angles of the Spacers are best illustrated in FIG. 11A, FIG. 11B, FIG. 12A, and FIG. 12B. As can be seen, the Tilt Angles are about 30°±15°, as was explained above, allowing the Conoids to assemble and extract from the Spheroids with no interference, and giving the Spacers enough of force component in the Mating direction to support Axial loads, while still being able to support Side loads.

The azimuth angles are best illustrated in FIG. 11C and FIG. 12C. They are chosen to maximize the torque provided by the Spacers around the axis of in-plane rotation. Therefore in FIG. 11 the Spacers are oriented at 45° to the edges of the plate, so that the projection of their Axes on the Mating plane are each perpendicular to a line between them and the center of rotation at the center of the plate, but in FIG. 12 the Spacers are oriented parallel the edges, since the center of rotation is at a corner of the plate. As before, deviating from this angle does not immediately break the functionality of the mount. However, if a Spacer were to be rotated so that the projection of its Spacer Axes on the Mating plane intersects (or nearly intersects) the axis of rotation, it would be applying zero (or close to zero) torque, and would not be generating an independent equation.

Further, to keep the Spacers in compression, they are oriented so that the torques they apply counter-act each other.

The torques applied by the Spacers are shown as double-lined arrows.

FIG. 13 shows another embodiment of the mount, similar in geometry to the embodiment shown in FIG. 11, but using ball-in-V-groove Sliders [131], and Pill Spacers [132].

FIG. 14 shows another embodiment of the mount, using ball-in-V-groove Sliders [141], and Pill Spacers [142]. In this embodiment, the Slide Axes of the Sliders are collinear [143], and the Sliders located on adjacent corners. The Spacer Axes are therefore parallel to this common Axis, and counter act each other. This is best illustrated in the top view [14C]. The torques applied by the Pill Spacers are shown as arrows.

FIG. 15 shows another embodiment of the mount, using ball-in-V-groove Sliders [151], and Pill Spacers [152]. In this embodiment, the Slide Axes of the Sliders are collinear [83], and the Sliders are located on opposing corners. The Spacer Axes are parallel to this common axis, and counter acting. This is best illustrated in the top view [15C]. The torques applied by the Pill Spacers are shown as arrows.

As stated above, the embodiments of the individual Spacers and Sliders, in and of themselves, are not at the core of this invention. It is the specific combination of two Sliders mating elements and two Spacer mating elements, and their placements and orientations that underlie the invention. The orientation and placement of the mating elements is independent of their embodiment, and the considerations for selecting them remain the same across embodiments.

BiColar

Aspects of this invention include a "BiCollar" Slider mating element that constrains two DOFs between mated subassemblies. A BiCollar mating element consists of two Collar mating elements (FIG. 6D, FIG. 7C) sharing one of their spherical bodies. The shared body, whose center's distances from the centers of the other two spherical bodies is thus constrained to move along an arc. Since the Collar (which serves as the building block for the BiCollar mating element) consists of simple bodies of revolution, it is easy to fabricate and provides a high load capacity.

The BiCollar Slider is a drop-in replacement to the other Slider mating elements mentioned above—the BiSphere, the Spherolinder, and the Bead. Like the latter two, the BiCollar has a much higher load capacity than the BiSphere, but because it uses CS interfaces exclusively, it has lower friction than them, and is cheaper to fabricate.

Figure 16:
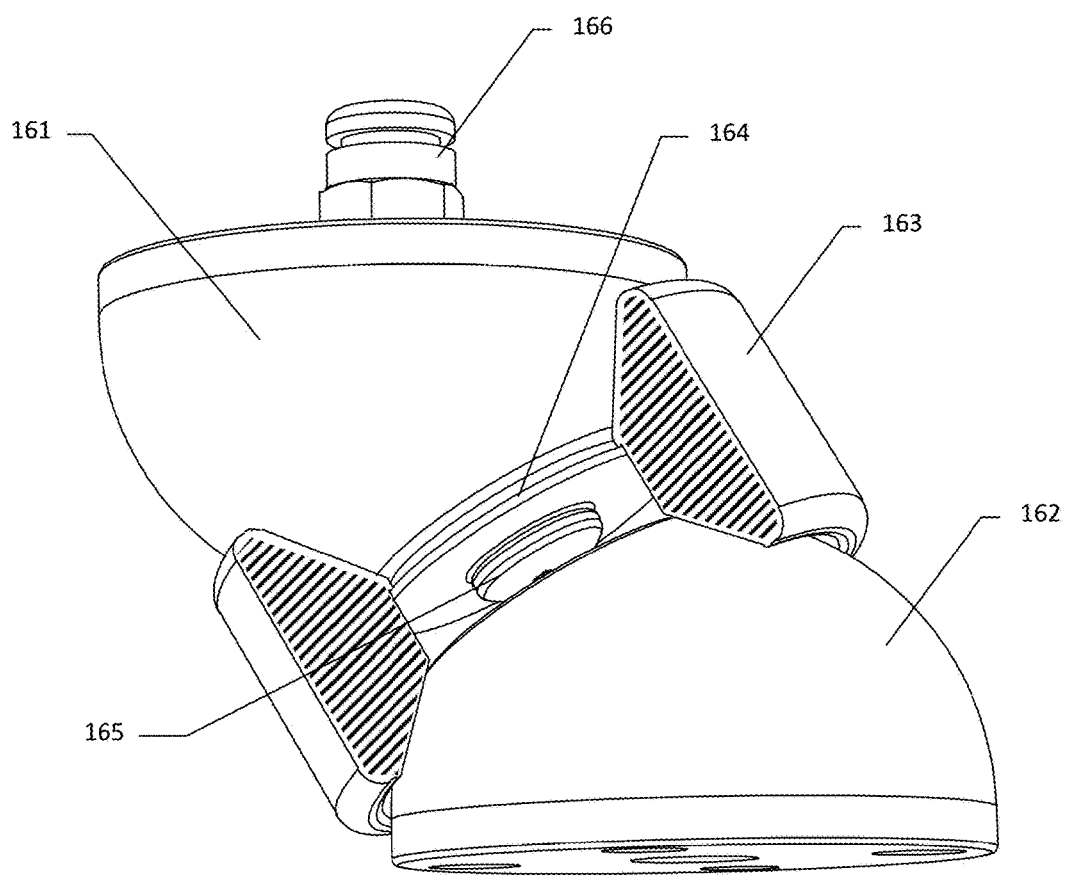
FIG. 16: Collar mating element

A detailed look at an embodiment of a Collar element is shown in FIG. 16. The two Spheroids [161], [162] are fabricated as short cylinders with spherical caps, the Spherical caps also having flat faces in the direction of the Collar [163] in order to allow the Spheroids to be placed closer together. The top Spheroid [161] has a retainer disc [164] attached to it, and this ring keeps the Collar [163] captive to the upper Spheroid (so the ring does not fall off), but still able to move in all directions, since the disc is fitted loosely around the bolt [165] that's holding it in place. An air path leads from an inlet [166] through the body of the Spheroid to the retaining disc, to allow a burst of compressed air to ensure the mating element is clean of particulate contamination just before mating.

Note that the Spheroids do not rotate relative to the mating subassemblies—it is the sliding of the Conoid around the static Spheroid surface that creates the motion. However, from the point of view of the CS Pair, the motion is equivalent to a Spheroid rotating inside a Conoid.

Figure 17:
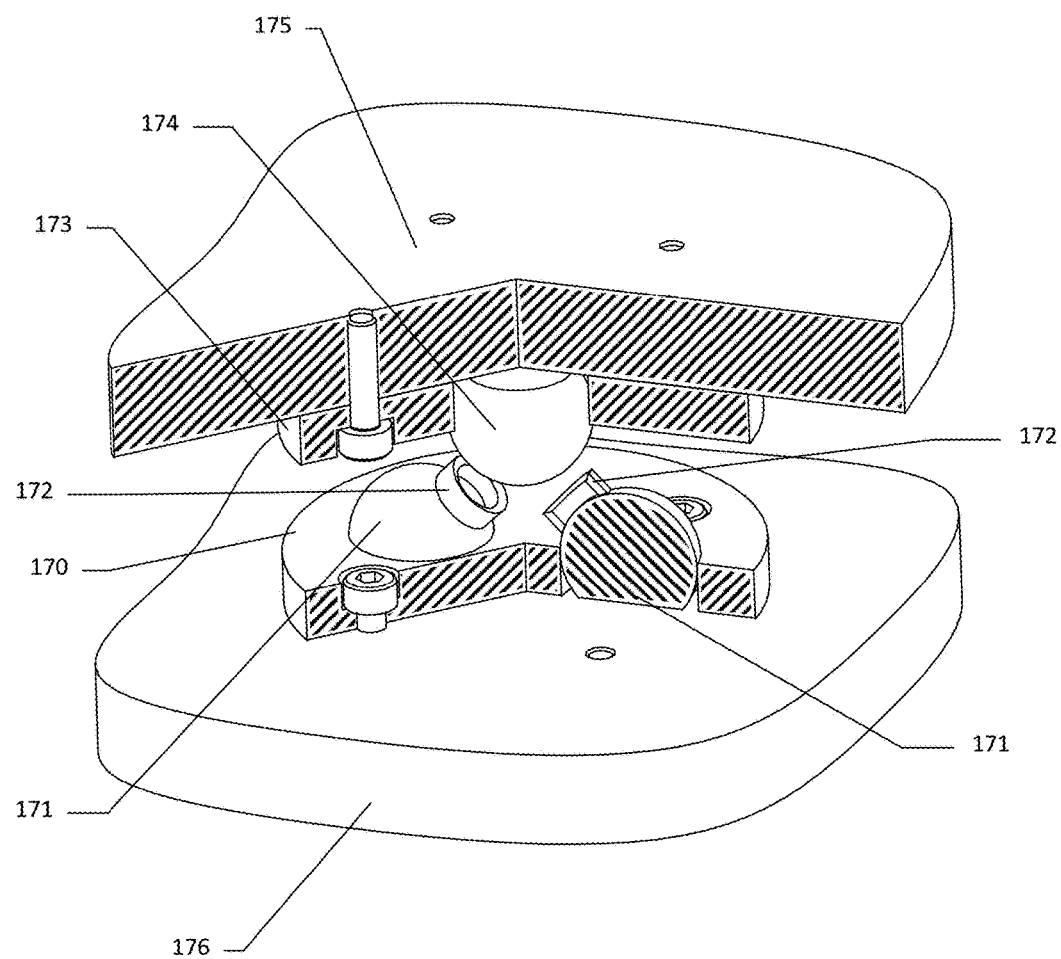
FIG. 17: BiCollar mating element

An embodiment of a BiCollar mating element is depicted in FIG. 17, achieves functionality practically equivalent to existing Slider mating elements by using the combined rotations of two Collar mating elements. Such motion is much preferred over linear sliding motion since the Conoid is tangent to the Spheroid along the line of contact between itself and the Spheroid, so that if the leading point experiences friction, at the micro level, the cone "climbs" over it by virtue of its shape.

The base part of the BiCollar mating element, equivalent to a traditional "v" groove, comprises a fastening plate [170], two truncated spheres [171], and two Collars [172]. The Collar on the right is shown in cross-section. The truncated spheres are press-fitted into the fastening plate, so cannot move in its plane. They transfer vertical load through their flat surface directly to the subassembly attached to the fastening plate. The truncated spheres cannot rotate because their flat faces are pressed against the parent subassembly [176].

The top part of the mating element comprises a fastening plate [173] and a truncated sphere [174] acting as the common Spheroid. Here too, the flat face of the truncated sphere is pressed against the parent subassembly [175].

Both the fastening plates are bolted to the parent subassemblies that are to be mated kinematically [175, 176]. These subassemblies are represented in this depiction by flat plates, though this is not essential. In the full kinematic mounts, multiple mating elements (typically three or four) are connected between the two subassemblies to create the mount.

The Collars present one conic face towards each sphere such that the conic faces are tangent to their respective spheres. This constrains the distance between the centers of the two Spheroids touching the Collar to be a fixed value. In effect, the mating element would have functioned the same if the Collars were removed and the Spheroids were allowed to contact each other directly, except that the load carrying capacity would have been reduced due to the point contact.

The Spheroids and Collars are typically made from high-strength stainless steel, and it is advantageous to have the Collars made from a material with a lower yield point, so that if the yield stress is exceeded, the plastic deformation occurs at the collar and is spherical in shape. Similarly, it is advantageous if the Collar has a lower elastic modulus, since then any elastic deformations are primarily confined to the collar and are spherical in shape. Spherical deformations present less of a hindrance to rotational motion.

In other embodiments, the elements can be made from other metals including aluminum, copper or bronze as dictated by design requirements, or from non-metals ranging from plastics to ceramics.

In some embodiment, anti-friction coatings, lubricants, or other treatments are applied to the contact surfaces of the Conoids or the Spheroids in order to reduce friction.

The fastening plates function as a method to attach the Spheroids to the subassemblies in a robust manner. In different embodiments, the truncated spheres can be fastened directly to their respective subassemblies as is done in the Collar mating element shown in FIG. 16, welded, glued, or otherwise connected.

The simplest way to combine to Collar mating elements into a BiCollar mating elements is by using two "dedicated" Spheroids in one component of the mating element and one "common" Spheroid on the other component, the latter Spheroid being shared by both Collar mating elements. However, in some embodiments it is also possible to simply place two Collar mating elements in close proximity to each other (still having the Collars in the same directions), thus using a total of four Spheroids.

In this embodiment, the Spheroids are made of material that is more rigid than the Conoid, so elastic deformations occur primarily in the Conoid, and the contact line continues to slide over a spherical object. Additionally, the Spheroids are made of a material that is stronger than the Conoid, so even in the case of plastic deformation, they occur on the Conoid, and just re-shape it into a Sphere, which can continue to slide over the Spheroid. These properties reduce the resistance of the mating element to motion under load.

An analogy to a sphere in a v-groove is very instructive to understand the operation of the BiCollar mating element. The sphere touched the v-groove in two points, one on each face. Each point can move on its respective face in two dimensions, but the combined constrain allows the sphere to move within the v-groove only in one dimension. Similarly, each Collar allows the common Spheroid to move in two DOFs around its dedicated Spheroid, describing a spherical surface around it. The combined motion of both Collars allow the common Spheroid to move only along a one-dimensional arc, as depicted in FIG. 18 and explained further below.

Figure 18:
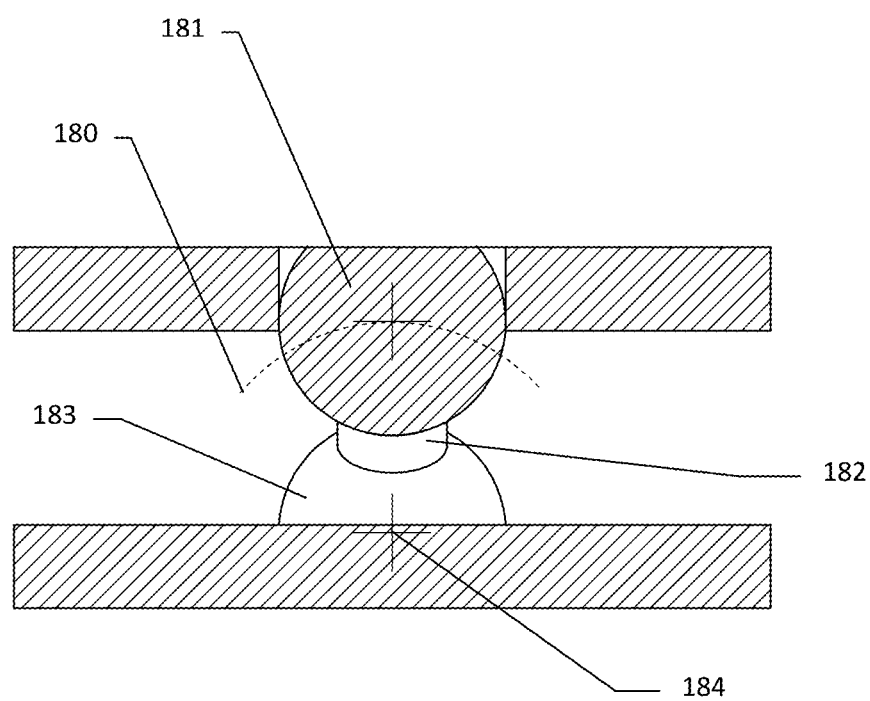
FIG. 18: Cross-section of BiCollar mating element

FIG. 18 shows the same embodiment in cross-section. The dashed arc [180] shows the path that the center of the top Spheroid [181] can take, as long as it is in contact with both Collars [182], which are themselves in contact with their respective bottom Spheroids [183] (Only one of each is visible in the cross-section). The path is an arc perpendicular to and centered around the line between the centers [184] of the bottom Spheroids, the top of which is horizontal, and so for small motions, approximates the straight line motion of a sphere in a v-block.

Even for larger motions, however, this mating element functions well in a kinematic mount, since there is no requirement that the Slider move along a straight line. Motion along a well defined arc is equally one-dimensional.

The Slider Axis for the BiCollar element is defined as the projection of the arc of motion of the top Spheroid on the mating plane.

The embodiment shown in FIG. 17 can only withstand compression loads, as if the bottom subassembly is on the floor, and the load is simply a gravity load. If on the other hand the assembly was on a tip-tilt table, or the upper subassembly was pulled upwards, the mating element would simply separate. This is very similar to the situation in a standard sphere-in-v-groove mating element, which also can only support compressive loads. The standard mitigation is to create a preload between the subassemblies, and the best way to do this is using a tensile retaining fastener that acts through the center of the common Spheroid and pulls the two halves of the mating element towards each other. Ideally, such a retainer does not change its length if the four unconstrained DOFs (one translational DOF and three rotational) are exercised.

Figures 19, 19A:
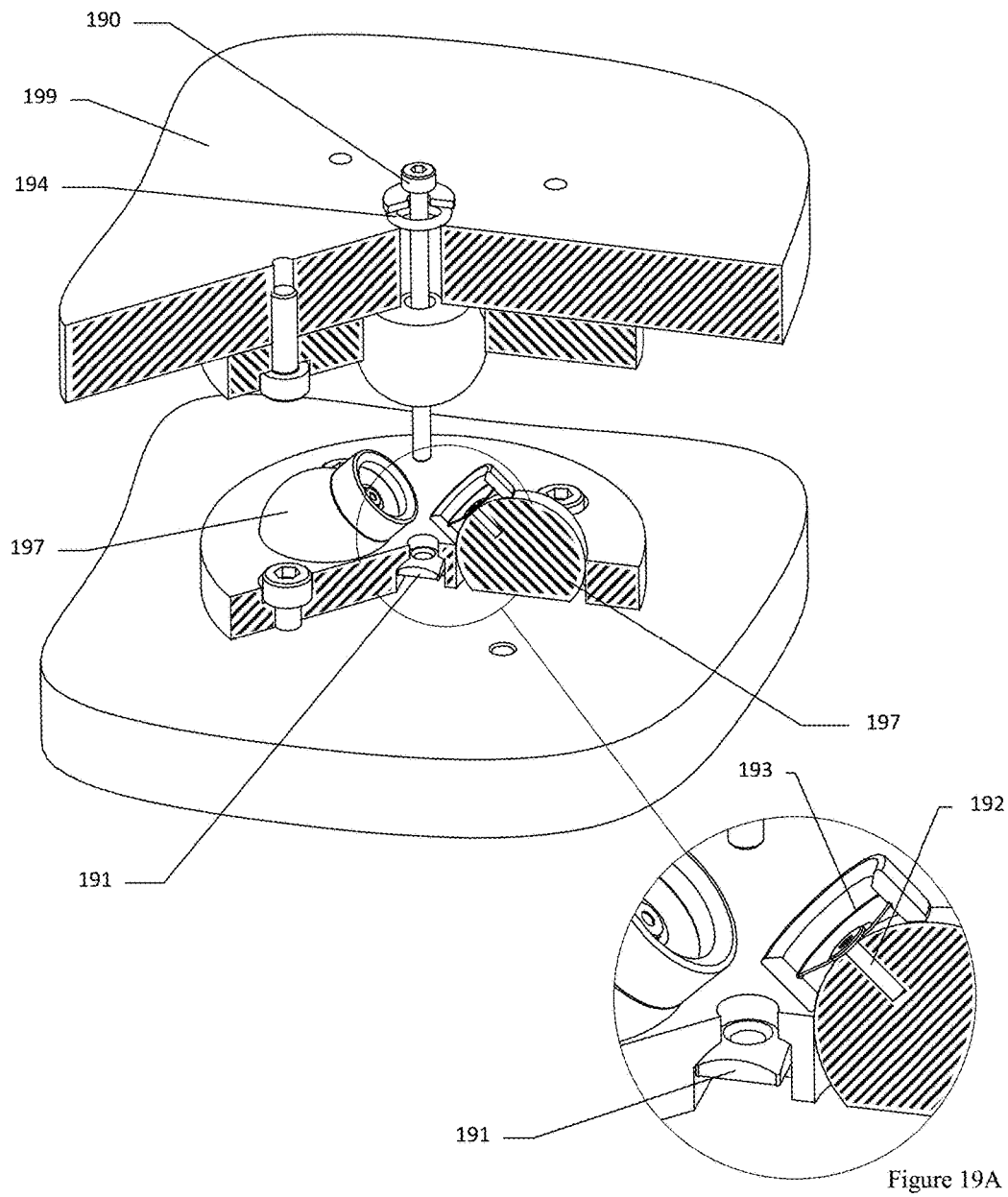
FIGS. 19 and 19A: BiCollar mating element with retainer

FIG. 19 shows an embodiment of the invention depicting a number of additional elements.

A retainer bolt [190], in conjunction with a captive non-rotating nut [191], are used to fasten the subassembly attached to the top component [199] of the mating element to the bottom component. As explained, such retainers are necessary if the mate is to be used in an assembly that might be expected to operate upside-down, or under dynamic conditions. The nut [191] has a curved top surface, whose center lies on the line between the centers of the bottom Spheroids [197], so that if the top component were to follow its prescribed arc of motion, the retainer bolt would rotate around the same center without having to change length. An O-ring and a washer [194] are used in this embodiment to give the head of the bolt the ability to tip and tilt, while maintain a certain force preload. In other embodiments, other flexible elements such as springs or spring washer can perform the same function.

Additionally, a small retainer pin [192] in conjunction with a retainer disc [193] are used to loosely locate the Collars near their nominal position so that they self-align when the two components of the mating element are mated. The hole at the center of the retainer disc is larger than the diameter of the neck of the pin, so disc is able to move a small amount in any direction perpendicular to the axis of the pin.

In another embodiment, the retainer disc is attached to the pin, but is elastic, made from a material such as silicon, providing the same functionality. The pin is friction fit into a hole drilled in the Spheroid, in the direction of the nominal position of the Collar.

In another embodiment, the Collar-Spheroid pair is encapsulated by an elastomeric shell that retains the Collar near its nominal position.

The two base plates [192] that belong to the two subassemblies that are being mated kinematically are shown, though they are not part of the invention and only have to interface correctly with the mating bolt holes [193].

Figure 20:
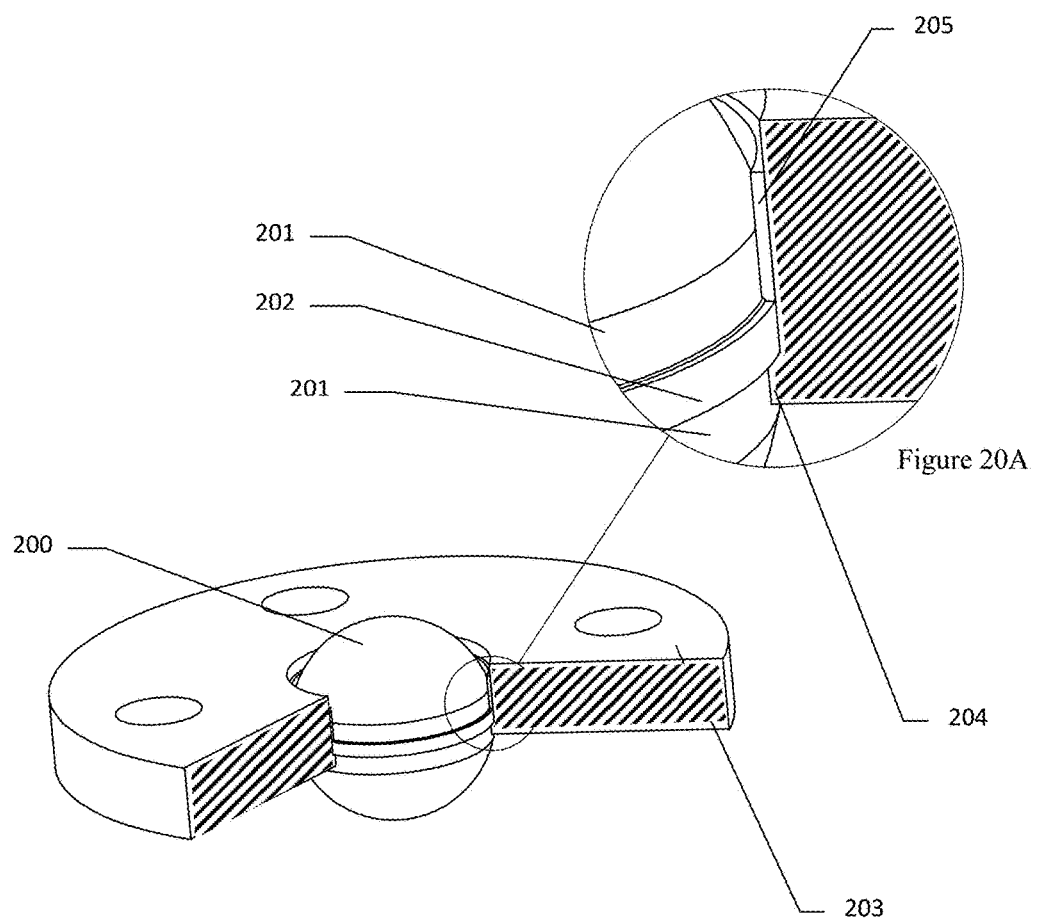

FIG. 20 shows an alternative embodiment of the top component of the mating element. Rather than using a truncated sphere that transfers the vertical forces through its flat surface, the Spheroid used here is a complete sphere [200] into which two circumferential notches [201] were ground, on either side of an equatorial belt [202]. This "Belted Sphere" is then sandwiches between a stepped edge [204] of the mounting bracket [203], and a press-fitted ring [205] that is pushed in and welded in place. In this embodiment, lateral loads on the sphere are transferred through the walls of the hole in the mounting bracket.

Figure 21:
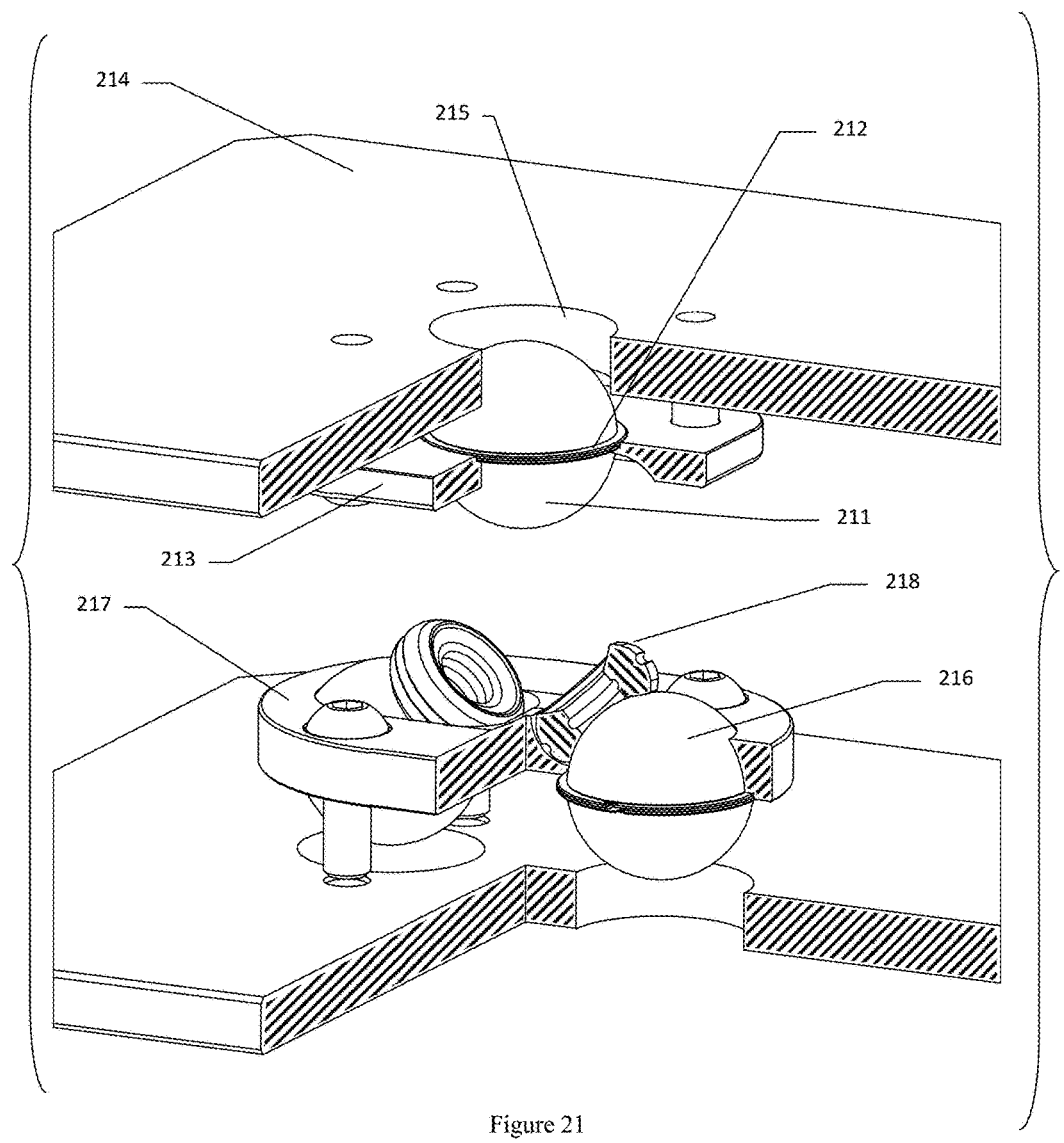
FIG. 21: BiCollar mount using complete spheres

FIG. 21 depicts an exploded view of a similar embodiment of the invention. Instead of using a Belted Sphere as the Spheroid, in this embodiment the Spheroid is implemented as a "Ringed Sphere"—a full sphere [211] into which a perimeter slot has been cut, and mated with a thin retainer ring [212] which can be press-fitted into the slot, soldered, or glued. The ring of the Ringed Sphere is in turn trapped between a mounting plate [213] and the load bearing surface of one of the mating subassemblies [214]. The mating subassembly has a hole [215] into which the Ringed Sphere is press-fitted when the mounting plate [213] is tightened into place.

In this embodiment, a similar mechanism is manifested at the bottom component, where each of the two Spheroids [216] is implemented as a Ringed Sphere, and both are attached to the mating subassembly using a shared mounting plate [217], and located using its own press fitted hole.

The Conoid contact surfaces [218] of the Collars in this embodiment are slightly concave to increase their load carrying capacity in comparison to that of straight conic Collars. This concaveness can be fabricated, for example, when machining the Collar, or it can be formed into a straight-conical Collar by pushing a hard spherical tool into it.

As is the case in previous embodiments, the Spheroids do not rotate relative to the mated Subassemblies.

Figure 22:
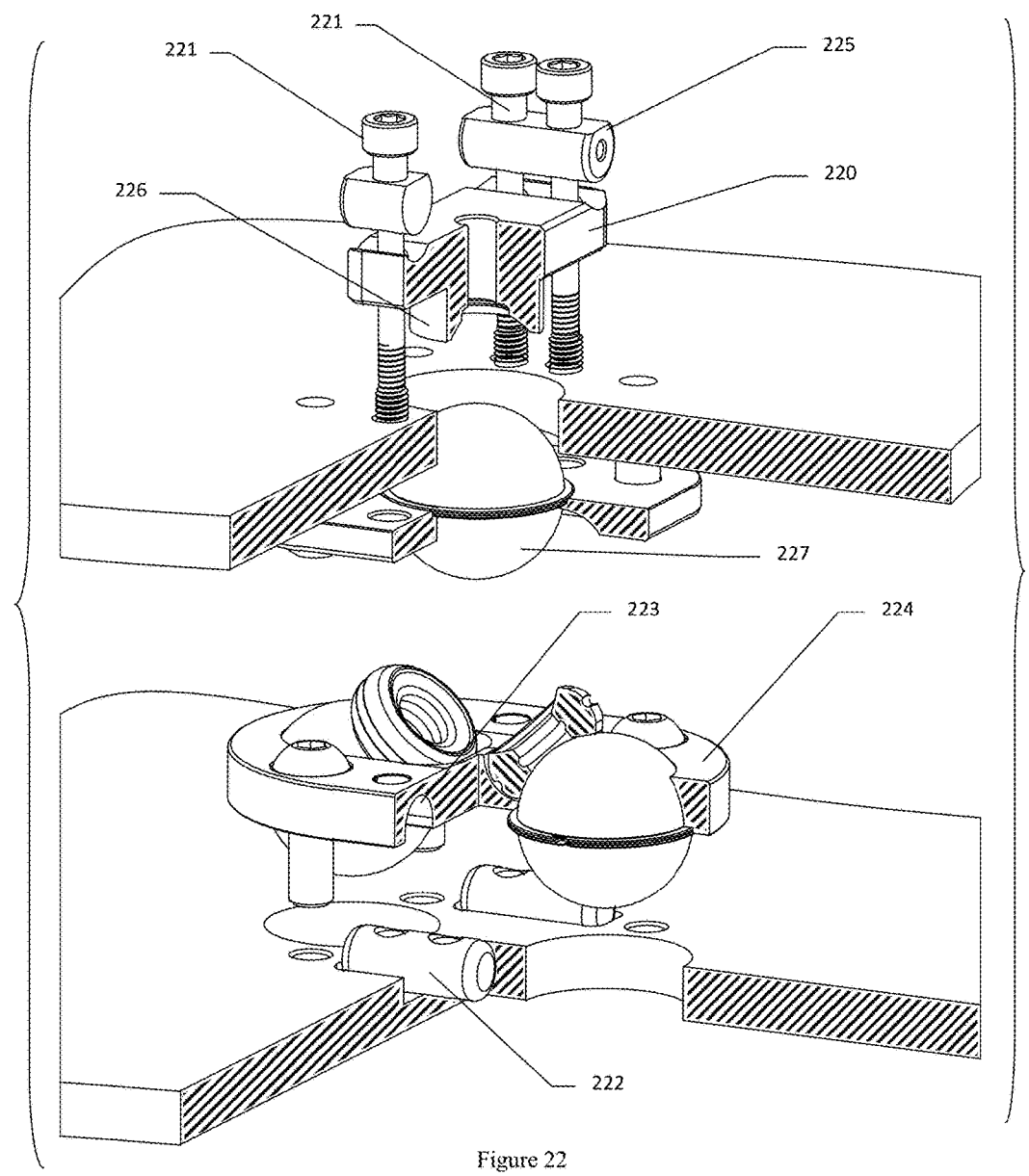
FIG. 22: BiCollar mount using complete spheres, with retainer

FIG. 22 depicts another embodiment of the invention, building on the embodiment shown in FIG. 21. In this embodiment, a retainer plate [220], retainer bolts [221] and retainer nuts [222] are added to the assembly to secure the two halves together against any force that tries to separate the mated subassemblies—a situation that can occur, for example, if the assembly is tilted, flipped, jolted, or vibrated. The retainer nuts [222] are cylindrical, allowing the retaining mechanism to follow the motion of the Collars on the Spheroids. The axes of the retainer nuts are at the same height as the line between the two bottom Spheroids. The retainer nuts are kept captive by channels [223] in the bottom mounting plate [224]. Two additional cylindrical adapters [225] allows the top of the retainer screws [221] to rotate with the motion of the Collars without having to have a flexible element under them. The retainer plate [220] pushes against the top Spheroid [227] using a conical feature [226] which allows the retainer plate to tip, tilt, and swivel around the top Spheroid [227] in response to motions of the top subassembly. The retainer mechanism therefore perform a similar function to that of the retainer bolt [190] in FIG. 19.

BiCollar mating elements can be used wherever Slider elements are used in the context of a kinematic mount, such as in the two-Slider two-Spacer mounts described above.

Figure 23A:
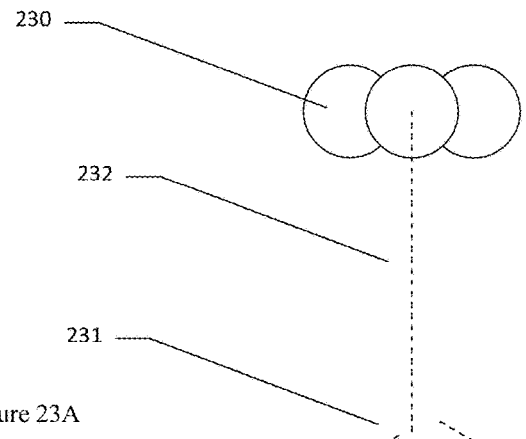
FIGS. 23A-23B: Complete 3-BiCollar mount

FIG. 23A shows a schematic representation of a three-Slider geometry using the BiCollar mating elements [230] arranged around a common center [231] with their Slide Axes [232] offset from the common centroid by a small amount.

Figure 23B:
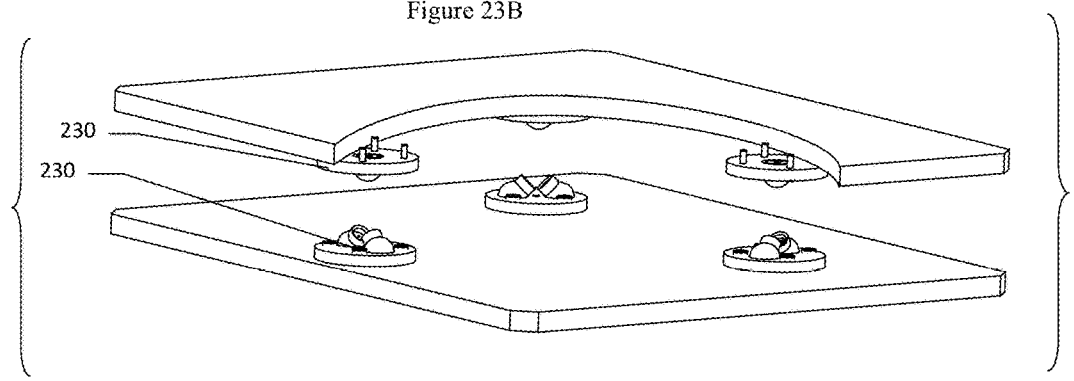

FIG. 23B depicts an embodiment of this geometry. The embodiment is shown before mating occurs, with a gap still existing between the two subassemblies being mated along the mating axis.

This mount is functionally equivalent to a 3-groove mount, but has a much higher load carrying capacity, and exhibits less friction due to the properties of the CS interface. As with a 3-groove mount, there's no requirement for the axes of the mating elements to intersect exactly at a common point.

Figures 24A, 24B:
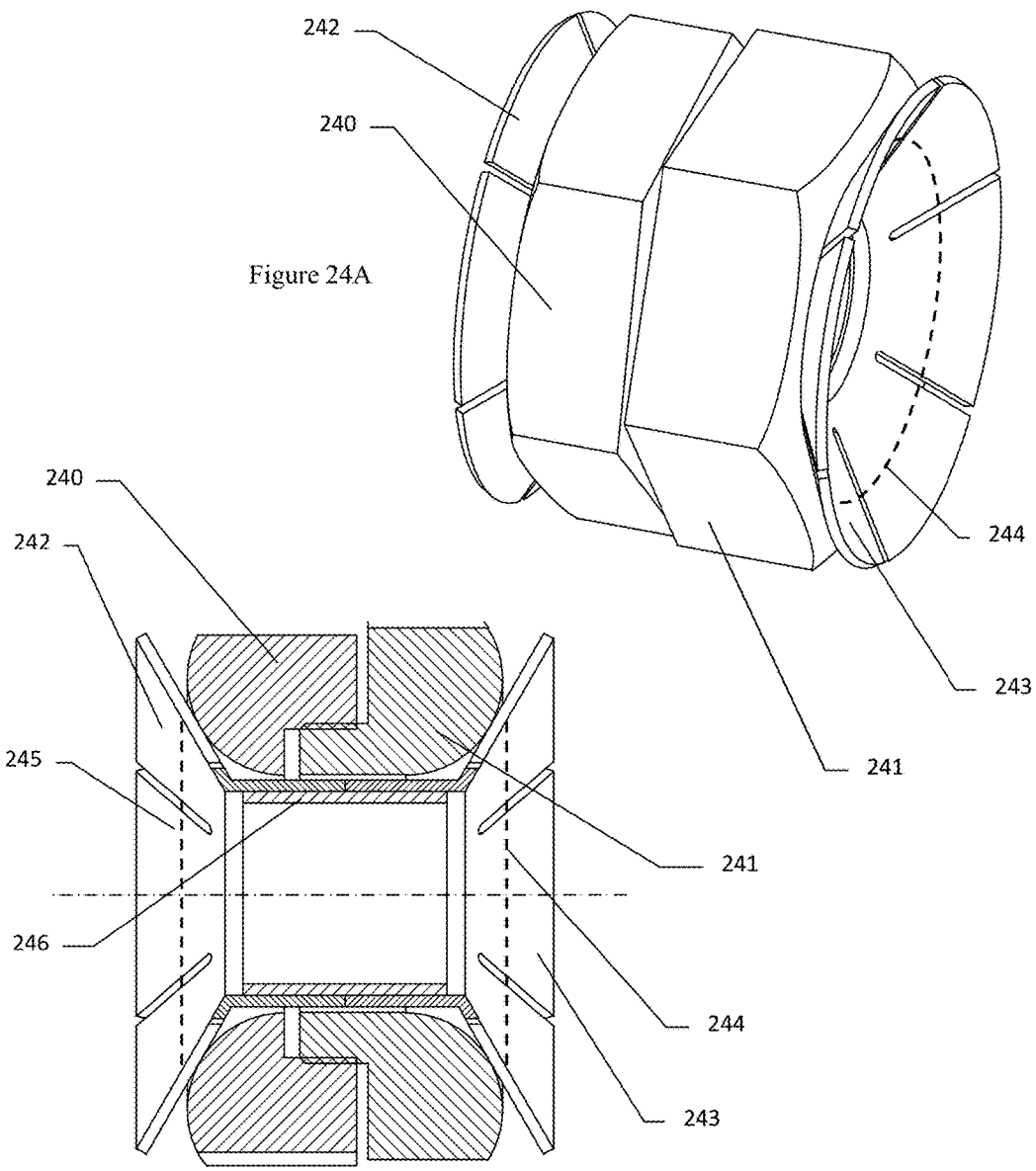
FIGS. 24A and 24B: Mechanically adjustable collar

FIGS. 24A and 24B depict an embodiment of a Collar whose effective length (the distance between the centers of the Spheroids touching it) is adjustable (an "Adjustable Collar"). The length adjustment is achieved by turning the two threaded bodies [240,241] relative to each other, causing them to move relative to each other along their axes of rotation. As they do so, they control the opening angle of flexible Conoid bodies [242,243], which are made flexible by cutting slots into them. The two flexible Conoid bodies are press fitted onto an inner tube [246] to enable assembly around the pair of threaded bodies. The contact line between the threaded bodies and the flexible Conoids is adjacent the contact line between the Conoids and their Spheroids, indicated by the dashed line [244,245]. (The Spheroids are not shown). As the opening angle of the Conoids changes, this line will invariably move, and so the amount of adjustment is limited, since once it moves a certain distance away, the flexibility of the Conoid will mean it will no longer be able to carry the load. However, in many optical system, adjustments in the <100 um range are all that is required. The Conoids do not rotate during the adjustment process.

When considering a BiCollar mating element that uses two adjustable collars, it is clear that a lengthening (or shortening) of both Collars by the same amount results in a vertical motion with no sideways motion component, and vice-versa (for small motions) a lengthening of one Collar and a shortening of the other by the same amount results in a sideways motion with no vertical motion.

An adjustable BiCollar therefore has the ability to neatly either lift/lower the top Spheroid, or move it from side to side.

Therefore, when considering a 3-Slider kinematic mount that uses three adjustable BiCollars, it is relatively easy to adjust the out-of-plane motions of Tip, Tilt and Z-motion by adjusting each of the mating elements only in the vertical direction. Rotation of the mount in-plane is achieved by moving all three mating elements sideways (either clockwise or counter-clockwise), and motion in the X-Y direction (in-plane) is achieved by calculating the vector sum of three sideways motions of the mating elements.

In other embodiments, the threaded pair [240, 241] is controlled by an electrically controlled actuator such as a servo motor.

Figure 25:
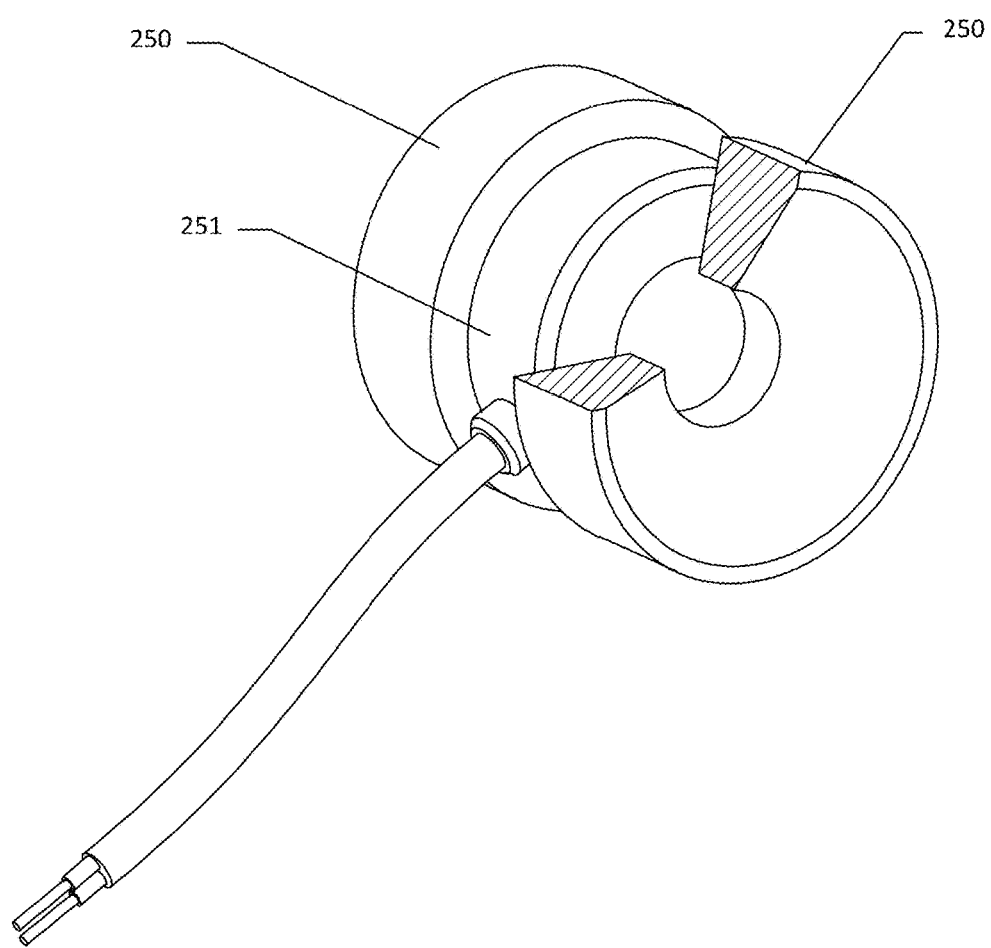
FIG. 25: Electrically adjustable collar

FIG. 25 depicts another embodiment of an Adjustable Collar comprises two Conoid bodies [250] separated by a piezo electric stack [251], achieving highly controlled adjustment of the distance between the two Conoids, without any relative motion between the Conoids and the Spheroids, other than that results from the shift in position of the entire kinematic mount.

In other embodiments, the piezo electric stack can be replaced by other forms of linear actuators such as piston or lead screws.

The present invention has been described in relation to particular examples, which are intended in all respects to be illustrative rather than restrictive. Those skilled in the art will appreciate that many different combinations of hardware, software, and firmware will be suitable for practicing the present invention. Moreover, other implementations of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A kinematic mount for connecting two subassemblies along a mating direction and constraining exactly all of possible degrees of freedom (DOFs) between the two subassemblies, the kinematic mount comprised of at least three mating elements, characterized in that:
   at least one of said three mating elements comprises: a pair of adjacent Spheroid bodies configured to be fixed to one of the subassemblies, a common Spheroid body configured to be fixed to the other subassembly, and a pair of Collar bodies each having two Conoid surfaces, configured such that said common Spheroid body contacts one Conoid surface of each of the pair of Collar bodies, and each remaining Conoid surface, one belonging to each Collar body, contacts one of said pair of adjacent Spheroid bodies;
   wherein at least one of the pair of adjacent Spheroid bodies and the common Spheroid body comprises a truncated sphere.

2. The kinematic mount of claim 1, wherein each of the pair of Collar bodies allows the common Spheroid to move in two DOFs around one of the pair of adjacent Spheroid bodies, thereby describing a spherical surface around it and a combined motion of both of the pair of Collar bodies allow the common Spheroid to move only along a one-dimensional arc.

3. The kinematic mount of claim 1, wherein each Conoid surface is tangent to a corresponding Spheroid along a line of contact between the Conoid surface and the corresponding Spheroid.

4. The kinematic mount of claim 1, further comprising at least one retainer configured to hold one of the pair of Collar bodies, allowing the Collar body to slide on one of the pair of adjacent Spheroid bodies.

5. The kinematic mount of claim 1, wherein each of the pair of Collar bodies is made from a material having a lower yield point from the material of the pair of adjacent Spheroid bodies and the common Spheroid body.

6. The kinematic mount of claim 1, wherein each of the pair of Collar bodies has a lower elastic modulus than that of the pair of adjacent Spheroid bodies and the common Spheroid body.

7. The kinematic mount of claim 1, further comprising a fastening plate, and wherein the pair of adjacent Spheroid is fastened to the fastening plate.

8. The kinematic mount of claim 7, wherein the pair of adjacent Spheroid comprises a pair of spheres that are press-fitted into the fastening plate.

9. The kinematic mount of claim 1, further configured to allow the two Conoid surfaces belonging to two different Collar bodies to detach along the mating direction from the Spheroid bodies that they contact.

10. The kinematic mount of claim 1, wherein at least one of the pair of Collar bodies comprises an adjustable collar whose effective length is adjustable.

11. The kinematic mount of claim 10, wherein the adjustable collar comprises an electrically controlled actuator.

12. The kinematic mount of claim 1, wherein each of the Conoid surfaces is generated by revolving a concave curve.

13. The kinematic mount of claim 1, wherein each of the pair of Collar bodies constrains to a fixed value a distance between centers of the common Spheroid and a corresponding one of the pair of Spheroids.

14. A kinematic mount for connecting two subassemblies along a mating direction and constraining exactly all of possible degrees of freedom (DOFs) between the two subassemblies, the kinematic mount comprised of at least three mating elements, characterized in that:
   at least one of said three mating elements comprises a first Spheroid body configured to be fixed to one of the subassemblies, a second spheroid body configured to be fixed to the other subassembly, and a Collar body having two Conoid surfaces, configured such that said first Spheroid body contacts one Conoid surface of said Collar body, said second Spheroid body contacts opposite one Conoid surface of said Collar body, and wherein each Conoid surface is tangent to a corresponding Spheroid along a line of contact between the Conoid surface and the corresponding Spheroid;
   wherein at least one of the first Spheriod body and the second Spheriod body comprises a truncated sphere.

15. The kinematic mount of claim 14, further comprising a retainer configured to hold the Collar body to one of the first and second spheroid bodies.

16. The kinematic mount of claim 15, wherein one of the two Conoid surfaces is configured to detach from one of the first and second spheroid bodies along the mating direction.

17. The kinematic mount of claim 14, further comprising a fastening plate, and wherein one of the first and second spheroid bodies is fastened to the fastening plate.

18. The kinematic mount of claim 14, wherein the Collar body comprises an adjustable collar whose effective length is adjustable.

19. The kinematic mount of claim 14, wherein each of the Conoid surfaces is generated by revolving a concave curve.

* * * * *